United States Patent
Vandenberg et al.

(10) Patent No.: US 11,144,556 B2
(45) Date of Patent: Oct. 12, 2021

(54) DYNAMIC STREAMING OF QUERY RESPONSES

(71) Applicant: CISCO TECHNOLOGY, INC., San Jose, CA (US)

(72) Inventors: Eric Vandenberg, Santa Clara, CA (US); Arjun Iyer, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 608 days.

(21) Appl. No.: 15/143,161

(22) Filed: Apr. 29, 2016

(65) Prior Publication Data
US 2017/0316007 A1    Nov. 2, 2017

(51) Int. Cl.
| | |
|---|---|
| *G06F 16/2457* | (2019.01) |
| *G06N 20/00* | (2019.01) |
| *G06F 16/248* | (2019.01) |
| *G06F 16/2455* | (2019.01) |
| *G06F 16/2458* | (2019.01) |
| *G06N 3/00* | (2006.01) |

(52) U.S. Cl.
CPC ...... *G06F 16/24578* (2019.01); *G06F 16/248* (2019.01); *G06F 16/2455* (2019.01); *G06F 16/2462* (2019.01); *G06N 3/006* (2013.01); *G06N 20/00* (2019.01)

(58) Field of Classification Search
CPC .................................................. G06F 17/3053
USPC ........................................................ 707/723
See application file for complete search history.

(56) References Cited

U.S. PATENT DOCUMENTS

| | | | | |
|---|---|---|---|---|
| 7,447,680 | B2 * | 11/2008 | Day ................. | G06F 16/24547 |
| 8,171,042 | B2 * | 5/2012 | Colclasure ............. | H04L 63/10 |
| | | | | 707/765 |
| 2005/0177561 | A1 * | 8/2005 | Ramanathan ......... | G06F 16/903 |
| | | | | 707/999.003 |
| 2007/0016558 | A1 * | 1/2007 | Bestgen .............. | G06F 16/2471 |
| 2007/0250470 | A1 | 10/2007 | Duffy et al. | |
| 2008/0222142 | A1 * | 9/2008 | O'Donnell ........ | G06F 16/24578 |
| 2009/0112853 | A1 * | 4/2009 | Nishizawa ........ | G06F 16/24568 |
| 2010/0088315 | A1 * | 4/2010 | Netz ..................... | G06F 16/221 |
| | | | | 707/737 |
| 2011/0282864 | A1 * | 11/2011 | Collins ............. | G06F 16/24534 |
| | | | | 707/719 |
| 2012/0054175 | A1 * | 3/2012 | Barsness ............. | G06F 16/2455 |
| | | | | 707/719 |

(Continued)

OTHER PUBLICATIONS

International Search Report and Written Opinion dated Aug. 5, 2016 in connection with PCT Application No. PCT/US2016/030256.

(Continued)

*Primary Examiner* — Pierre M Vital
*Assistant Examiner* — Andrew N Ho
(74) *Attorney, Agent, or Firm* — Behmke Innovation Group LLC; James M. Behmke; James J. Wong

(57) ABSTRACT

Instead of processing a query as-is, the query is chunked or broken down into a sequence of smaller chunked queries and the chunked results of those smaller queries are streamed back to the requester. Chunking the query and streaming the chunked results can substantially decrease the user's time to value when running a query by returning some immediate results for display which are refined and eventually converge on the full results as each chunked query runs.

20 Claims, 20 Drawing Sheets

(56) References Cited

U.S. PATENT DOCUMENTS

| | | | |
|---|---|---|---|
| 2012/0078951 A1* | 3/2012 | Hsu ................... | G06F 16/24568 |
| | | | 707/769 |
| 2013/0173662 A1* | 7/2013 | Kaplinger ......... | G06F 16/24542 |
| | | | 707/774 |
| 2014/0122530 A1* | 5/2014 | Bhatia ............... | G06F 16/24532 |
| | | | 707/779 |
| 2014/0236664 A1* | 8/2014 | Zenger ................ | G06Q 10/063 |
| | | | 705/7.27 |
| 2014/0289236 A1 | 8/2014 | Agarwal et al. | |
| 2014/0337315 A1 | 11/2014 | Slezak et al. | |
| 2015/0058092 A1 | 2/2015 | Rea et al. | |
| 2015/0310015 A1 | 10/2015 | Alexander et al. | |
| 2016/0092547 A1 | 3/2016 | Shivarudraiah et al. | |

OTHER PUBLICATIONS

European Search Report dated Nov. 15, 2019 Application No. EP16900745.

* cited by examiner

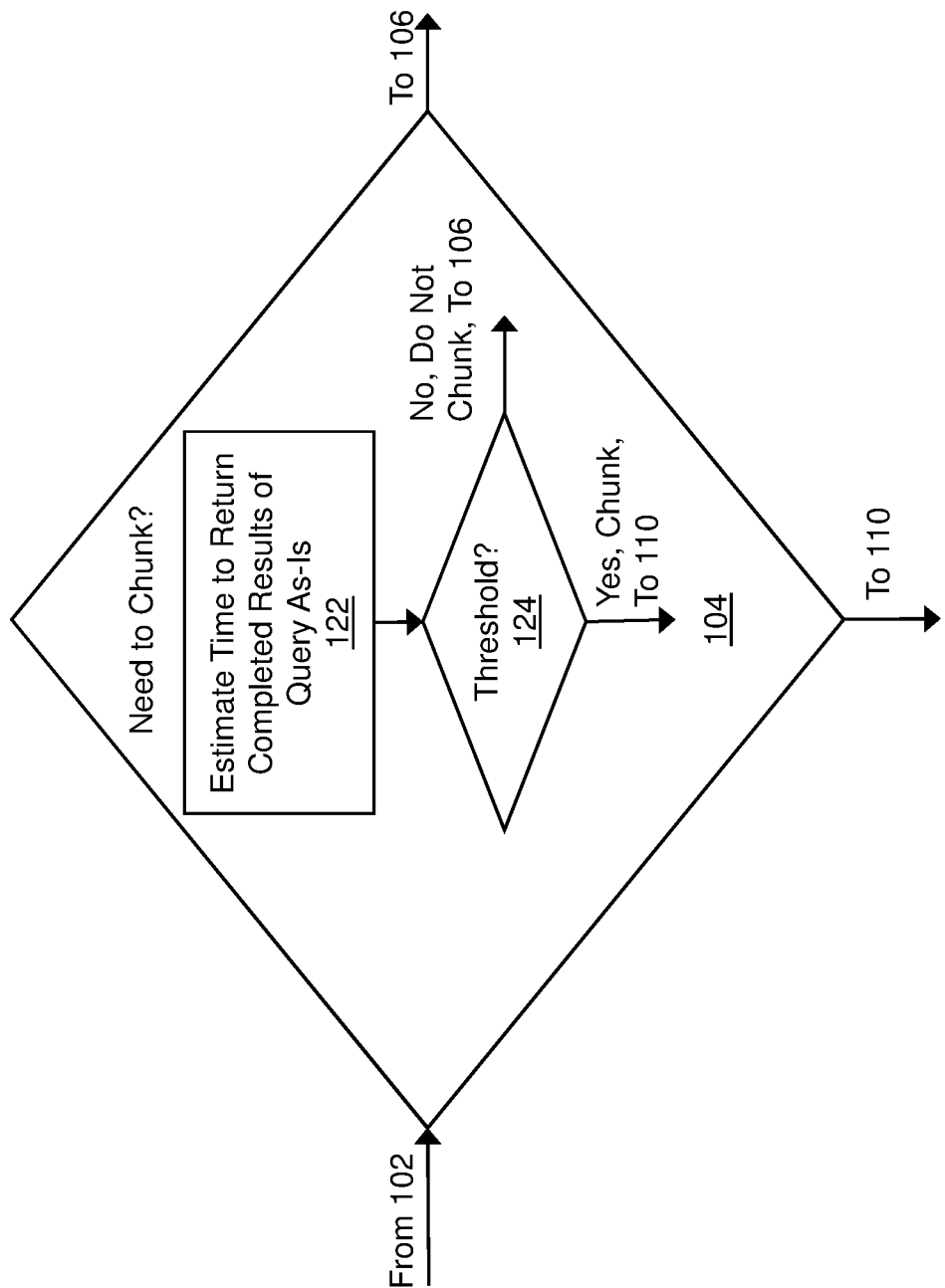

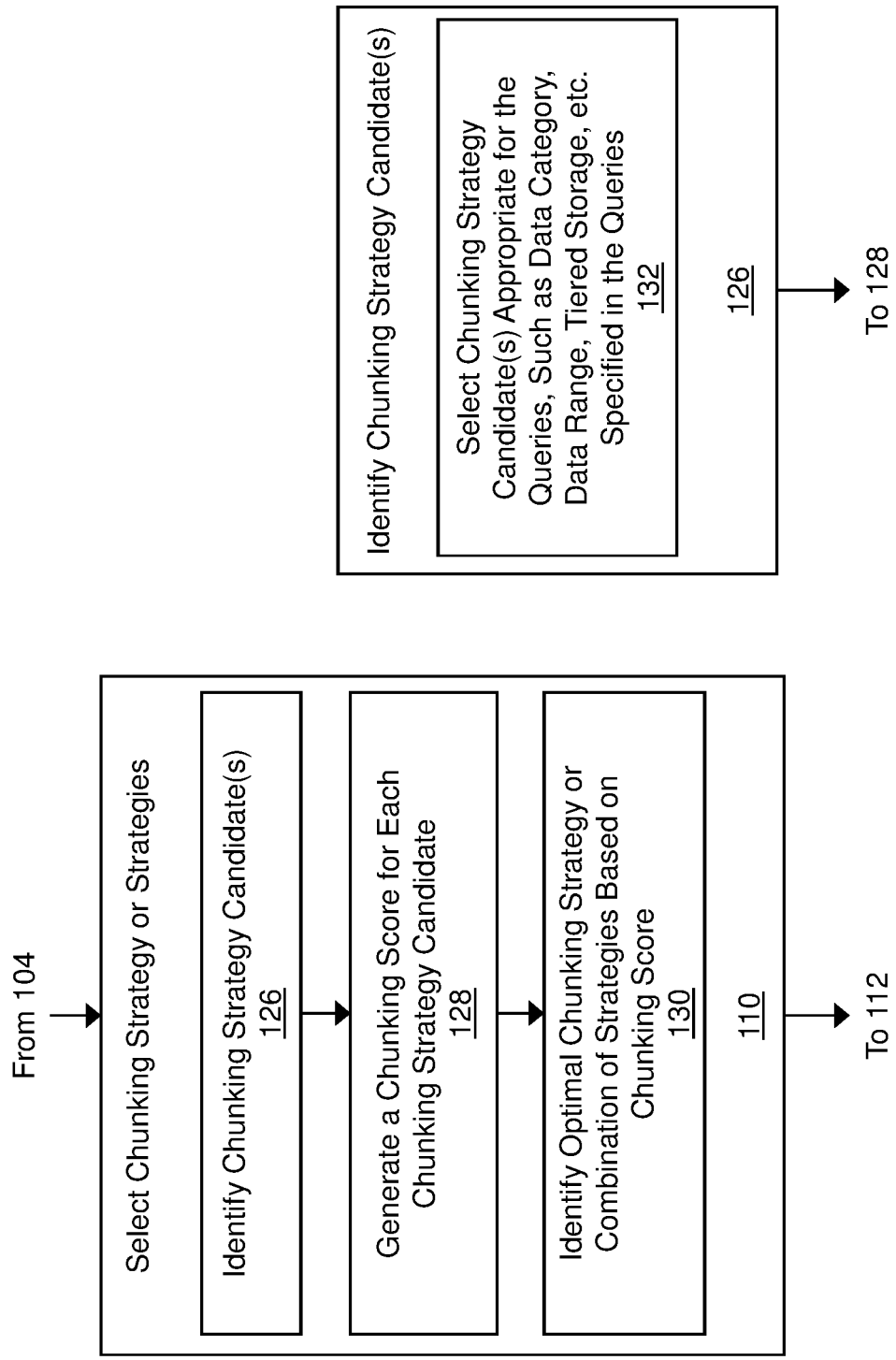

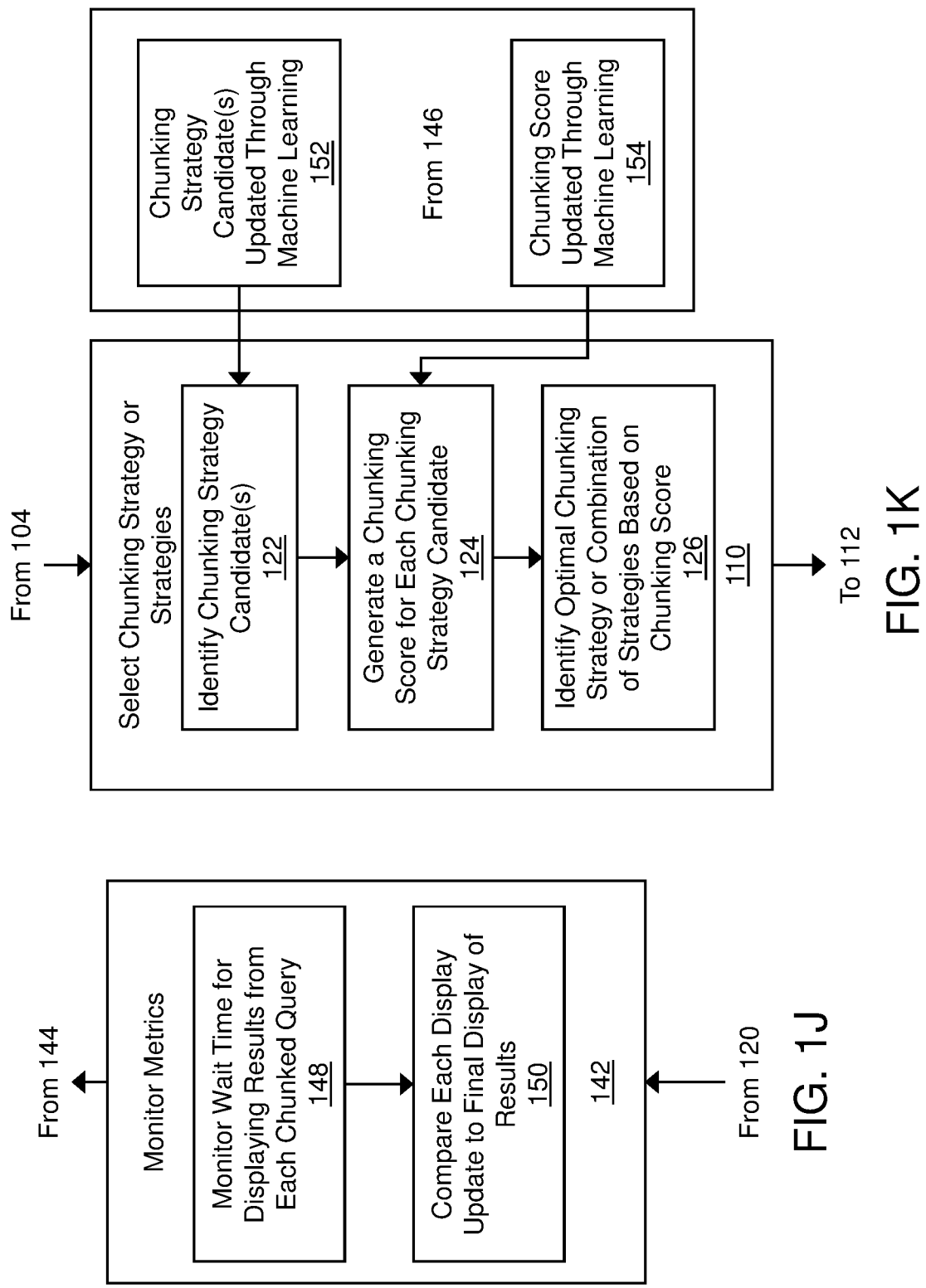

DYNAMIC STREAMING OF QUERY RESPONSES

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of dynamic query chunking and streaming of results of the chunked queries are disclosed.

In one aspect, a system for monitoring a business transaction is disclosed to include a processor; a memory; and one or more modules stored in the memory. The modules include instructions executable by a processor to perform operations including: receive, from a user interface client, a query for data indicative of performance of a monitored business transaction; determine whether to chunk the received query to generate multiple chunked queries; based on the determining, chunk the received query to generate the multiple chunked queries using a query chunking strategy; process the generated multiple chunked queries, wherein a result for each chunked query represents a portion of an overall result for the received query; and dynamically stream the result from each chunked query to the user interface client to be displayed as the processing of the chunked queries are completed so as to cause the overall result for the received query to be displayed portion by portion until converging on the overall result as the processing of all of the chunked queries are completed.

The system can be implemented in various ways to include one or more of the following features. For example, the one or more modules can be executable by a processor to determine whether to chunk the received query by estimating a processing time to return the overall result for the received query and comparing the estimated processing time against a threshold. The one or more modules can be executable by a processor to select the chunking strategy by performing operations including: identify chunking strategy candidates; generate a score for each candidate; and select the chunking strategy from the candidates based on the score. The one or more modules can be executable by a processor to identify the chunking strategy candidates appropriate for contexts of the received query. The one or more modules can be executable by a processor to dynamically stream the result from each chunked query to the user interface client to be displayed in the order the processing of each chunked query is completed. The one or more modules can be executable by a processor to assemble the results for a given chunked query with next subsequently completed chunked query to cause a combined result of the assembled chunked queries to be displayed. The one or more modules can be executable by a processor to assemble the results to cause the combined result of the assembled chunked queries to be displayed in different ways depending on a type of graphics used to display the combined result. The type of graphics can include a bar chart, a pie chart, or a time line. The one or more modules can be executable by a processor to determine an order of the chunked queries to be processed. The one or more modules can be executable by a processor to monitor metrics representing a performance of the query chunking strategy. The one or more modules can be executable by a processor to update the chunking strategy based on the monitored metrics. The monitored metrics representing the performance of the query chunking strategy can include a wait time for processing each chunked query. The monitored metrics representing the performance of the query chunking strategy can include a measure of how accurately the portion by portion display of the overall result of the received query compares to the converged overall result displayed.

In another aspect, a method for monitoring a business transaction is disclosed. The method includes receiving, from a user interface client, a query for data indicative of performance of a monitored business transaction; chunking the received query to generate multiple chunked queries using a query chunking strategy; processing the generated multiple chunked queries, wherein a result for each chunked query represents a partial result for the received query; dynamically streaming the result from each chunked query to the user interface client to cause the result from a corresponding chunked query to be displayed and aggregated until converging to an overall result for the received query; and monitoring performance metrics of the chunking strategy.

The method can be implemented in various ways to include one or more of the following features. For example, the method can include selecting the query chunking strategy by performing operations including: identifying chunking strategy candidates; generating a score for each candidate; and selecting the chunking strategy from the candidates based on the score. The method can include determining an order of the chunked queries to be processed. The order can include processing at least two of the chunked queries in parallel. The method can include updating the chunking strategy based on the monitored metrics.

In yet another aspect, the disclosed technology can be implemented as a non-transitory computer readable medium embodying instructions when executed by a processor to cause operations to be performed. The operations performed include receiving, from a user interface client, a query for data indicative of performance of a monitored business transaction; estimating a wait time for the received query to return an overall result to be displayed; determining that the estimated wait time is longer than a predetermined threshold time indicative of an acceptable user experience; chunking the received query to generate multiple chunked queries using a query chunking strategy; processing the generated multiple chunked queries, wherein a result for each chunked query represents a partial result for the received query; and dynamically streaming the result from each chunked query to the user interface client to cause the result from a corresponding chunked query to be displayed and aggregated until converging to an overall result for the received query.

The non-transitory computer readable medium can be implemented in various ways to include one or more of the following features. For example, the query chunking strategy can be automatically assigned based on contents of the received query. The instructions when executed by a processor can cause operations to be performed including monitoring performance metrics of the chunking strategy. The instructions when executed by a processor can cause operations to be performed including updating the query chunking strategy based on the monitored performance metrics.

BRIEF DESCRIPTION OF THE DRAWINGS

FIGS. 1A, 1B, 1C, 1D, 1E, 1F, 1G, 1H, 1I, 1J, and 1K are flow diagrams showing exemplary query chunking processes for dynamically chunking one or more queries.

DETAILED DESCRIPTION

Figure 1A:
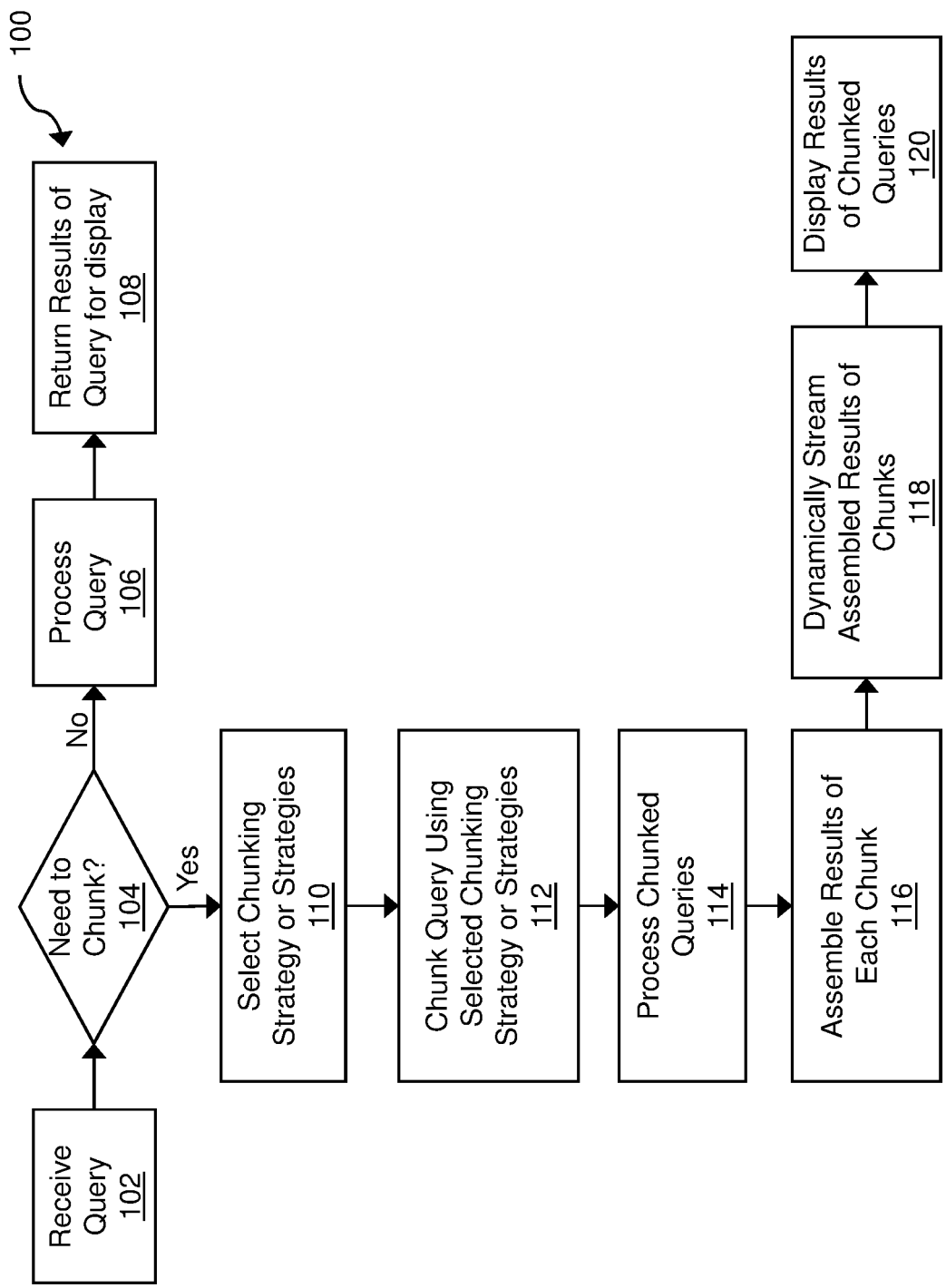

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and user experience, each web application can be monitored to provide insight into information that can negatively affect the overall performance of the web application. For example, information including bottle necks in communication, communication failures and other information regarding performance of the services that provide the web application can be detected. When monitoring multiple applications that touch multiple servers, determining the performance of a particular application can often be difficult. A given event on a given server or tier of application nodes may often affect a remote application. Manually reviewing and processing the performance data of each and every application on multiple servers to detect the event causing a problem is extremely time consuming exercise that may never lead to an adequate solution to the performance degradation problem.

The technology disclosed in this patent document provides for dynamic and efficient application intelligence platforms, systems, devices, methods, and computer readable media including non-transitory type that embody instructions for causing a machine including a processor to perform various operations disclosed in this patent document to obtain the desired application intelligence data. Specifically, the disclosed technology provides for a dynamic processing of user queries on application intelligence data to dynamically stream results of the processed queries that reduces user wait time.

Query Chunking Overview

When one or more queries for specific application intelligence data are received from the user, the wait time before the completed results are presented to the user can be lengthy depending on a number of factors including the amount of data associated with the queries and whether the queries must traverse multiple tiers of storage devices and locations. The prolonged wait time can cause the user to abandon the queries unwilling or unable to wait for the completed results. In addition, the system processing the queries can time out or stall due to the prolonged processing time. In both instances, the user is provided with no results and left unsatisfied.

According to the disclosed technology, when queries are received through a user interface (UI), rather than processing the queries as-is, the queries are dynamically processed to break down each query into a sequence of smaller "chunked" queries and dynamically stream the "chunked results" of the sequence of smaller queries back to the user interface. The disclosed dynamic processing of chunked queries and streaming of the chunked results can provide a number of advantages including substantially decreasing the wait time before results are displayed to the user on the UI. Rather than processing the queries as received and waiting until the completed results are obtained, the disclosed technology provides substantially immediate results in smaller chunks from the chunked queries which are continuously refined and eventually converge on the full completed results as each "chunked" query is processed.

The returned results are dynamically streamed and displayed to the user through the UI and the displayed results are updated as each chunk is processed. For example, a time series graph over a long period of time will show data incrementally appear in the graph with each chunk processed rather than waiting for the full results to show at one time. The incrementally shown data at each display update is the accumulation of all previously returned results. Thus, the data displayed at each update represents only a partial result until all of the chunks are processed and the corresponding results accumulated. The queries can be chunked to accurately represent the overall data at each increment compared to the overall completed results.

Each query can be dynamically analyzed to select the best strategy appropriate for the query. For example, a query chunking strategy can be automatically selected based on the data type specified in the query. A time series query, where the x-axis is the time dimension with some range bucketing, can be chunked using a time-based chunking strategy which splits up the query into N queries, one for each time range, over which the accumulation is computed and returned to the UI independently. Queries based on other data ranges, such as monetary amount, number of transaction, number of customers, etc. can be chunked by separating the data ranges into smaller groups. For a query where the x-axis is a categorical dimension (e.g., "user experience"), the query can either be split by the categorical dimension (for complete results) or by the time dimension (for partial results) and different strategies can be used based on pre-defined rules or runtime performance hints gathered from previous chunk query processing. In some implementations, a query can be chunked using strategies that breaks up the query based on how quickly each chunk can be processed and the results returned to the UI. The portions of the query can be processed quickly can be broken into separate chunks and processed while the other more time consuming chunks are broken into different chunks. In this manner, the results from the chunks that are processed can be returned for display while the longer time consuming chunks are being processed. The user is thus provided with substantially immediate results rather than having to wait for the entire query to be processed.

The disclosed technology is extensible and flexible to broad set of query chunking strategies. In some implementations, different chunks can be processed in series or in parallel. In some implementations, chunking strategies can be applied to multiple queries and results streamed dynamically chunk by chunk over the multiple queries rather than chucking each query separately. In some implementations, multiple query chunking strategies can be composed together easily. In some implementations, chunking strategies can be tuned appropriately across different backend data stores.

Moreover, metrics on the effectiveness of the chunking strategies can be monitored to assess and refine the different strategies using machine learning. Based on the monitored metrics on the effectiveness of the chunking strategies, future chunking strategies can be refined and improved to enhance the effectiveness of the strategies and the decision on which strategy to apply for a given query. By improving the chunking strategies through machine learning, each iteration of query chunking can produce improved results.

Query Chunking Techniques

Figure 1E:
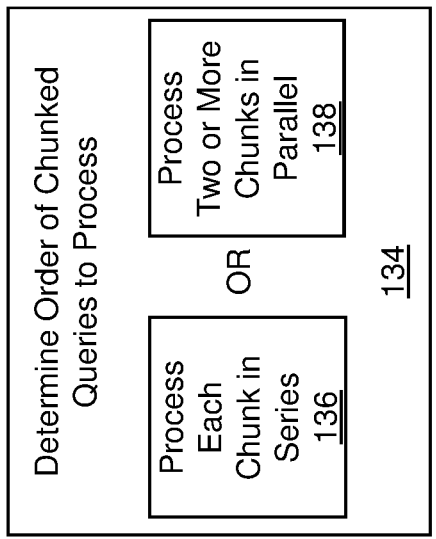
Figure 1F:
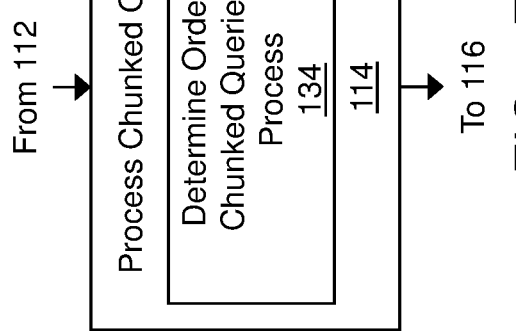
Figure 1H:
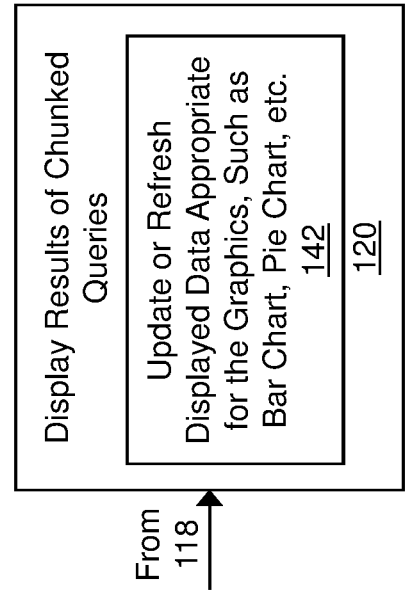
Figure 1G:
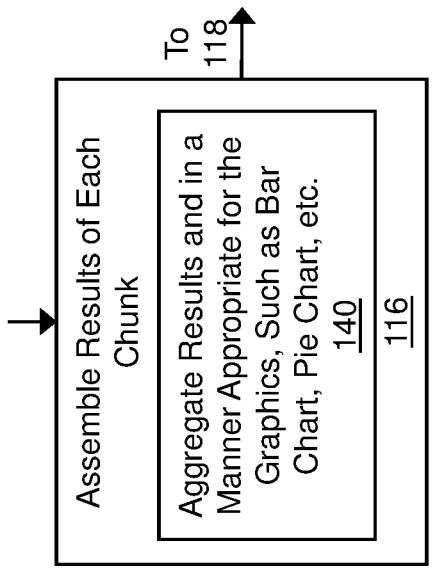

FIGS. 1A, 1B, 1C, 1D, 1E, 1F, 1G, 1H, 1I, and 1J are flow diagrams showing exemplary query chunking processes 100 and 160 for dynamically chunking one or more queries received through the UI client and streaming results of the processed queries back to the UI client. The processes 100 and 160 illustrated and described with respect to FIGS. 1A and 1H represent two exemplary dynamic query chunking and results streaming processes. FIGS. 1B, 1C, 1D, 1E, 1F, 1G, 1I, and 1J represent additional processes and sub-processes for processes 100 and 160 that can be performed separately or in any number of combinations. Thus, while possible, not all of the additional processes and sub-processes illustrated and described with respect to FIGS. 1B, 1C, 1D, 1E, 1F, 1G, 1I, and 1J need to be performed together and processes illustrated in any of the FIGURES can be combined with processes in any other FIGURE or FIGURES.

The query chunking process 100 can be performed by an analytics system that support asynchronous streaming of results in the controller UI service. The query chunking architecture according to the disclosed technology is described below with respect to FIGS. 2A and 2B. The query chunking process 100 includes a receiving process 102 for receiving a query or a set of queries from the UI client. The received query or set of queries can be against any number of application intelligence data obtained through ongoing monitoring of a given application environment.

A chunking determination process 104 is performed on the received query or set of queries to determine whether to break up the query or set of queries into smaller chunks of queries. As shown in FIG. 1B, the chunking determination process 104 can include a wait time estimating process 122 that estimates a wait time to return the completed results for the requested query or set of queries processed as-is. When determined that the estimated wait time to return the completed results for the requested query or set of queries satisfies a threshold at a threshold determination process 124, a determination is made to chunk the requested query or set of queries. When determined that the estimated wait time to return the completed results for the requested query or set of queries fails to satisfy a threshold at a threshold determination process 124, a determination is made to process the requested query or set of queries as-is. For example, the threshold wait time represents whether the analytics system will take too long to return the completed results for processing the query when processed as-is or that the analytics system will stall due to the long processing time. The threshold time period for determining whether the wait time to return completed result for the query is too long can be based on the acceptable user experience, which can be predetermined based on industry standard or customized by the user. For example, the threshold wait time can be set at 30 seconds, 1 minute, 2 minutes, etc. by default or customized by the user. Thus, in one exemplary implementation, when the estimated wait time to return the completed results of the requested query or set of queries satisfies a threshold of more than 30 seconds, more than 1 minute, more than 2 minutes, etc., the result of the chunking determination process 104 is to perform query chunking.

In some implementations, the wait time threshold determination process 124 can be performed based on whether the estimated wait time fails to satisfy a threshold of less than 30 seconds, less than 1 minute, less than 2 minutes, etc. When the estimated wait time is not less than the threshold wait time, then a determination is made to chunk the requested query or set of queries. Thus, the determination to perform query chunking can be triggered based on the estimated wait time being longer or shorter than the threshold wait time.

When the chunking determination process 104 determines that the received query or set of queries should be processed as-is, the received query or set of queries are processed as-is at process 106. The results of the query processed (as-is) are displayed to the UI client at process 108. The displayed results at 108 are the completed results that are displayed at once after the wait period to process the query (as-is).

When the determination is made to perform query chunking on the received query or set of queries, a chunking strategy or a set of chunking strategies are selected at chunking strategy selection process 110. As shown in FIG. 1C, the chunking strategy selection process 110 can include identifying an appropriate chunking strategy candidate(s) at process 126; generating a chunking score for each chunking strategy candidate at process 128; and identifying an optimal chunking strategy or combination of chunking strategies based on the chunking scores at process 130.

The scores are assigned by a chunking strategy that determines the optimality of the chunking strategy for chunking the query. Since chunking strategies are tuned for particular query equivalence classes, the exact criteria can vary accordingly.

Identifying the chunking strategy candidates can be performed based on associating a query with an equivalence class that is associated with the available chunking strategies. Each query chunking strategy is designed to work on a particular class of queries which can be identified by the dominant analytics functional parts of the query. For example, the query equivalence classes could be based on time-series, range, group by, other analytics functions and their applicable parameter ranges as directly parses out of the original query.

The scores for the candidate chunking strategies are computed by predicting how the candidates would perform based on usability metrics. These usability metrics can be predicted based on training data obtained from earlier query chunking processing. Examples of usability metrics include the following:

1. Time to realize value indicates how long the customer must wait to see results of value. This can include metrics, such as time to first chunk result, time to last chunk result, average time to next chunk result, uniformity in frequency of chunk results. For the time to realize value, a strategy that returns chunk results more frequently and faster would score higher. For example, when a chunking strategy that customer must wait 1 minute for the first chunk and each subsequent chunk until the last chunk, then the strategy would score lower than an alternative chunking strategy that predicts the customer must wait 10 seconds for the first chunk and 30 seconds each subsequent chunk.
2. Value convergence indicates how well the chunk results converge to the complete results. This can be measured by calculating the accuracy in each accumulated chunk result with the completed results at each point chunk results are streamed back to the caller. A strategy that has very poor accuracy until the final complete results in the last chunk would score lower than other alternative strategy with higher accuracy trends. The accuracy can be computed in different ways including: (a) % of accumulated chunk results that correctly match within the completed query result. This is relevant for some strategies that return complete partial results; and (b) % of difference between chunk results comparted to the completed query result.

The above usability metrics are further weighted to compute the overall chunking strategy score. The exact weighting which determines the tradeoff between time to value and value conference can be determined experimentally and tuned based on customer feedback and usability studies.

Moreover, in some implementations, composite scores can be computed when a strategy is defined through the composition of different strategies. For example, when there are two dominant parts to the query such as a time-series and sub-aggregation on ranges, then combining the related time-series and range chunking strategies that perform best on each dominant part of the query can be more optimal. The query can be decomposed into respective derived parts and the respective chunking strategy scores can be computed on the derived queries and the weighting of the resulting scores can be aggregated to obtain the composite chunking strategy score.

As shown in FIG. 1D, identifying the appropriate chunking strategy candidate(s) can be based on the nature or content of the received query or set of queries. For example, the data type or category (i.e., time, money, or different quantities of units), data range, tiered storage, etc. can be factored into the consideration in selecting the appropriate chunking strategy candidate(s). A set of predetermined chunking strategies can be stored and each predetermined chunking strategy can be pre-mapped to the data type or category (i.e., time, money, or different quantities of units), data range, tiered storage, etc. Examples of query chunking strategies are disclosed below with respect to FIGS. 3, 4A, 4B, 5A, 5B, 6A, 6B, 7A, 7B, 8A, 8B, 9A, 9B, 10A, 10B, 11A, and 11B.

The requested query or set of queries are chunked at process 112 using the appropriate query chunking strategy or strategies specifically selected for the requested query or set of queries. The resultant chunked queries are processed at process chunked queries process 114. As shown in FIG. 1E, processing the chunked queries can include a determining process 134 to determine an order of the chunked queries to be processed. The chunks of queries obtained from the query chunking process can be processed in a specific order to provide the best user experience to the end user. A number of factors can be considered in maintaining the best user experience. For example, the chunks that can be processed in the order of the fastest processing time first. In this way, the user can be almost immediately provided with an initial display of the results from the first chunk processed and then with updated results that accumulate each additional result of subsequent chunks that are processed. In addition to or as an alternative to the processing time for each chunk, the accuracy of the displayed results at each update with respect to the overall completed results can be considered. In this way, each time results are displayed to the user, the displayed results are not misleading when compared to the final completed results. Metrics can be generated that represent the accuracy of displayed data at each update as described further in FIGS. 1H, 1I, and 1J. The generated metrics can be used to update or improve the query chunking strategies using machine learning.

In addition, the chunked queries can be processed in any order. For example, as shown in FIG. 1F, determining the order of chunked queries to process can include a series processing 136 to process the chunks in series and streaming the results of each chunk to the UI client. Alternatively, determining the order of chunked queries to process can include a parallel processing 138 to process at least some of the chunks in parallel. In some implementations, some of the chunks are processed in parallel while others are processed in series. In some implementations, all of the chunks can be processed in parallel. Because each chunk may not require the same amount of time to process, different chunks can finish at different times, and the results of the completed chunks can be returned to the UI client in the order that the chunks are completed. The order in which the results are returned and displayed to the UI client can be modified based on the desired user experience. For example, results can be displayed out of turn (i.e., not in the order the chunks are processed) to maintain the accuracy of the displayed results at each update. In another example, results can be displayed out of turn (i.e., not in the order the chunks are processed) to provide a consistent or steady rate of display update. In this way, the user can experience updates to the displayed results in a consistent refresh rate rather than a random sequence of refresh times.

The results from the processed chunks are assembled to accumulate the results as necessary at process 116, dynamically streamed at process 118 to the UI client, and displayed. The dynamically streamed results of the processed chunks of queries are. For example, when the initial chunk of query is processed and the corresponding results are streamed, the initial results are displayed to the UI client at process 120. When multiple chunks are initially processed, the results of the multiple chunks are assembled together at process 116 and streamed at process 118. Specifically, the results may need to be accumulated to provide an updated result. In addition, the results can be assembled together in a manner appropriate for the type of graphics used to displayed the results at process 140. For example, the results for a pie chart may need to be assembled differently than the results for a bar chart or a line graph. The results of the chunked queries can be accumulated in other manners that enhances or maintains a level of user experience, such as reducing the wait time between updates and providing an accurate representation of the overall completed results during each update.

The assembled result of the dynamically streamed results of the chunked queries is displayed at process 120. Similar to and consistent with the assembling process 116, the display process 120 can be provided to enhance or maintain a level of user experience as shown in FIG. 1H. For example, the assembled data can be displayed and updated or refreshed in a manner appropriate for the type of graphics used to displayed the results. For example, the results for a pie chart may need to be refreshed differently than the results for a bar chart or a line graph. Even for a specific graphic type, a number of different refresh strategies can be deployed. For example, a pie chart can be refreshed to display data for all pieces of the pie during each update (that includes additional processed and accumulated results from chunked queries). Alternatively, a pie chart can be refreshed to display data for a particular piece or pieces of the pie first and then other pieces in subsequent updates. During the update, the sizes of the pieces of the pie can be maintain at a consistent level to display results during each update that are not misleading or inaccurate when compared to the overall completed results of all chunked queries. For a timeline display, the initially displayed results can be for the earliest time slice or range with each subsequent update displaying subsequent time slices or ranges. In addition, in order to enhance or maintain a level of user experience, the display process 120 can include holding back certain earlier accumulated results to display at a later time or with one or more subsequent accumulated results.

Figure 1I:
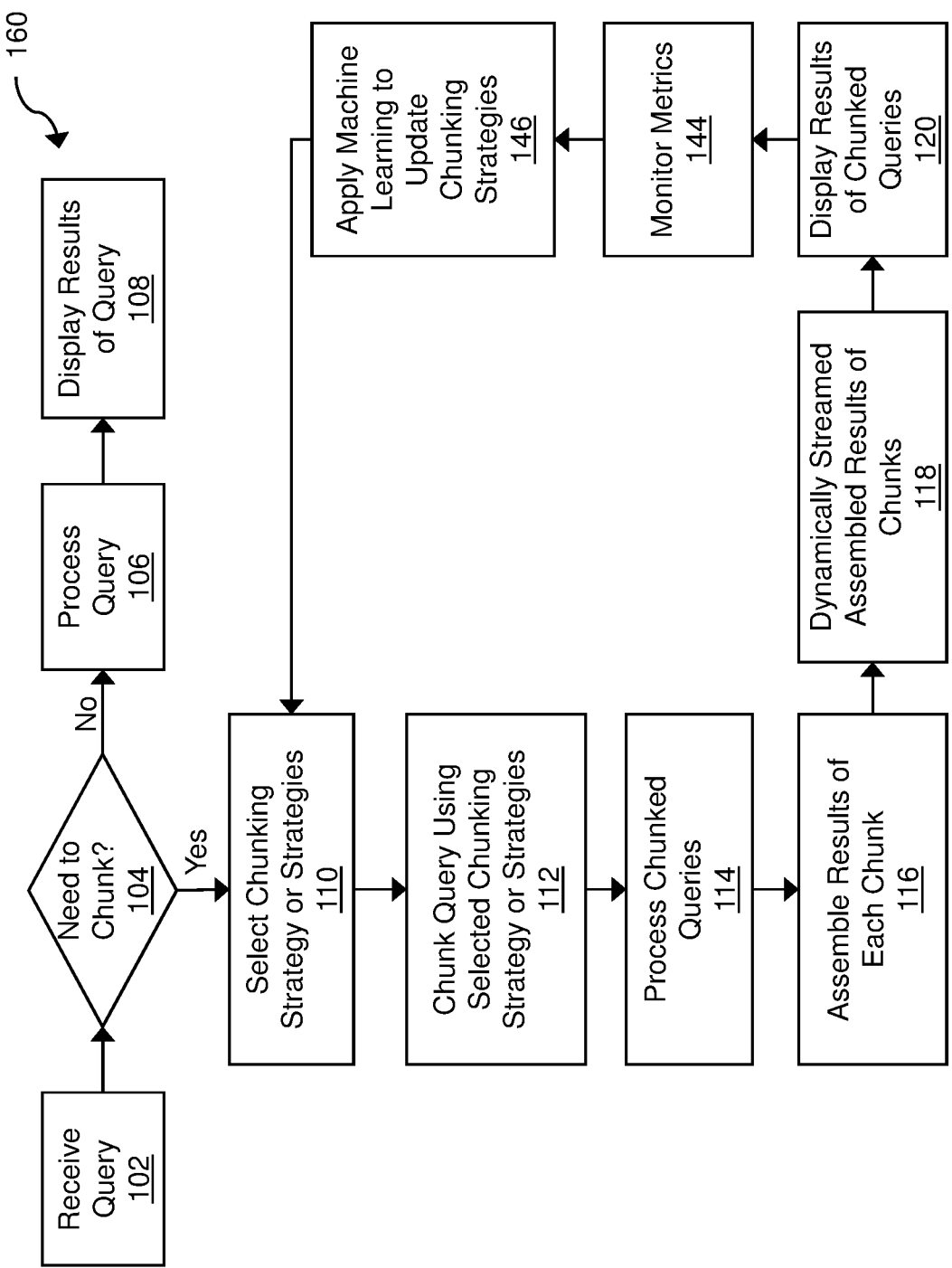

In some implementations, query chunking metrics monitoring and machine learning can be added to the query chunking process 100 to continuously update and improve the query chunking strategies that improves the overall user experience. FIG. 1I represents an exemplary query chunking process 160 that incorporates query chunking metrics monitoring and machine learning using the monitored query chunking metrics. The process 160 in FIG. 1I is substantially similar to the process 100 in FIG. 1A but adds a query chunking monitoring process 144 and a machine learning process 146. As shown in FIG. 1I, the results of the query chunking monitoring process 144 are used by the machine learning process 146 to provide a feedback loop to the chunking strategy selection process 110.

The metrics monitoring process 144 is further described with respect to FIG. 1J. Each time a given query or a set of queries are chunked and the corresponding results are dynamically streamed, assembled, and displayed as described above with respect to FIGS. 1A, 1B, 1C, 1D, 1E, 1F, 1G, and 1H, certain metrics that indicate the effectiveness of the chunking strategy or strategies used can be monitored. As shown in FIG. 1J, the monitoring the metrics can include monitoring, at process 148, the wait time for displaying the results during each update. Monitoring the wait time at process 148 can include not only the individual wait time for each display update but also include other time-related metrics. For example, the consistency or variation of the wait time from one update to another can monitored. Also, the different between the estimated wait time and the actual wait time for each chunked query can be monitored. Other time-related metrics that can impact the user experience can be monitored. Moreover, the monitored metrics can be adjusted or customized based on the desired user experience of a given user. For example, one user may prefer to experience a consistent rate of wait time from one update to another. A different user may prefer to receive results in a certain order regardless of the fluctuation in wait time between display updates.

Additional metrics other than time-related metrics can be monitored. For example, monitoring the metrics can include comparing, at process 150, the accuracy of displayed results at each update to the finally displayed results from all chunks. Also, the order of the results displayed during each update can be monitored and compared against the desired user experience settings. Other metrics can include monitoring the effects of querying against data in different tiers of storage and seasonal conditions, such as a specific time of the day, a specific day in the week, a specific week in the month, a specific month in the year, etc. that the chunked queries were executed.

As shown in FIG. 1K, the monitored query chunking metrics can be used by the machine learning process 146 to update the chunking strategies at process 152 or update the chunking score at process 154. The updated chunking strategies and updated chunking scores can be fed back to the chunking strategy selection process at 110 to improve the chunking strategy candidate identification process 122 and the chunking score generation process 124. For example, a previously recommended chunking strategy for a time-series query can be modified to create smaller or bigger time range chunks. Also, the score generated for a given query chunking strategy can be updated based on the actual performance of the chunking strategy that may affect it from being selected in the next subsequent query chunking process.

The ability to calculate the chunking strategy score can depend on predicting various metrics such as query processing times and accuracy convergence. In order to perform the prediction accurately, a machine learning model can be used which is established by providing training data from previously executed queries. The machine learning model can include various features including: (1) query equivalence class; (2) query time range; (3) storage tiering model; and (4) data volume.

The observation and prediction outcome can be query response time. With enough training data, the machine learning model can predict future query processing times. As the chunking framework drives the chunking query process, each chunk query itself is added into the training set and the model parameters can be recalculated to improve the scoring mechanism. In addition, non-chunking queries can also be added into the training set since the non-chunking queries can be similar to chunk queries in other query requests. Similarly, value convergence can also be predicted for certain chunking strategies. When value convergence is predicted, the training data can be based on features of the original query and chunking strategy parameters, such as the number of chunks and how the chunks are broken down, with the observation being the accuracy convergence.

Query Chunking Architecture

The dynamic query chunking and streaming of results of the chunked queries as disclosed in this patent document including processes 100 and 160 are performed in an analytics system of an application intelligence platform. As described further with respect to FIGS. 12 and 13 below, an application intelligence platform includes a controller communicatively linked to one or more agents. One or more agents are installed on a machine, such as an application server that executes an application to be monitored by the application intelligence platform. The one or more agents monitor metrics of performance data for the application being monitored and sends the monitored performance metrics to the collector to be processed. An end-user can interface with the application intelligence platform through the UI client served by the controller to submit requests for queries against the monitored performance metrics data. Typical performance metrics data include transaction time for each business transaction and the average transaction time over a time period.

Figure 2A:
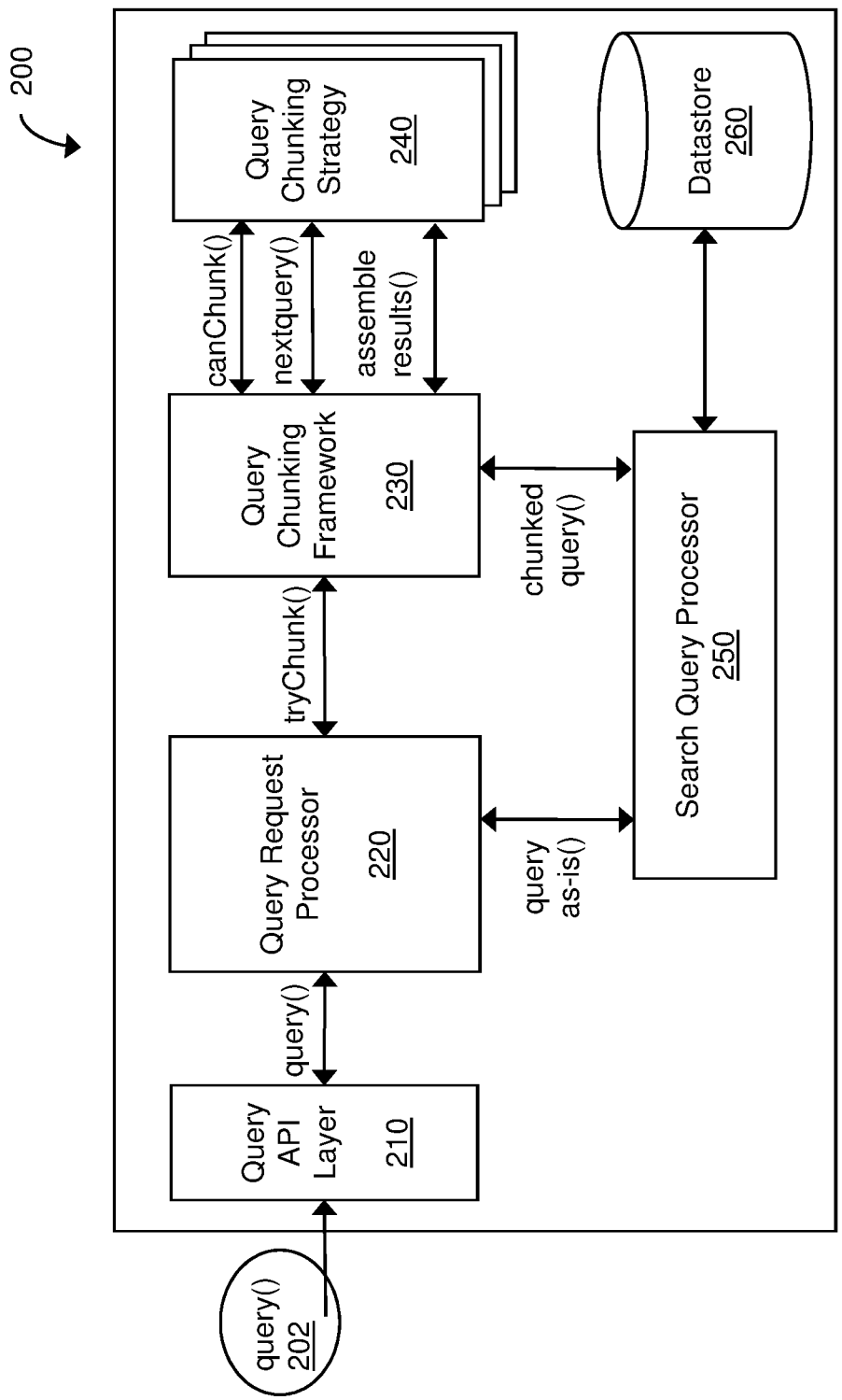
FIGS. 2A and 2B represent exemplary analytics systems in an application intelligence platform that incorporate query chunking architectures.
Figure 2B:
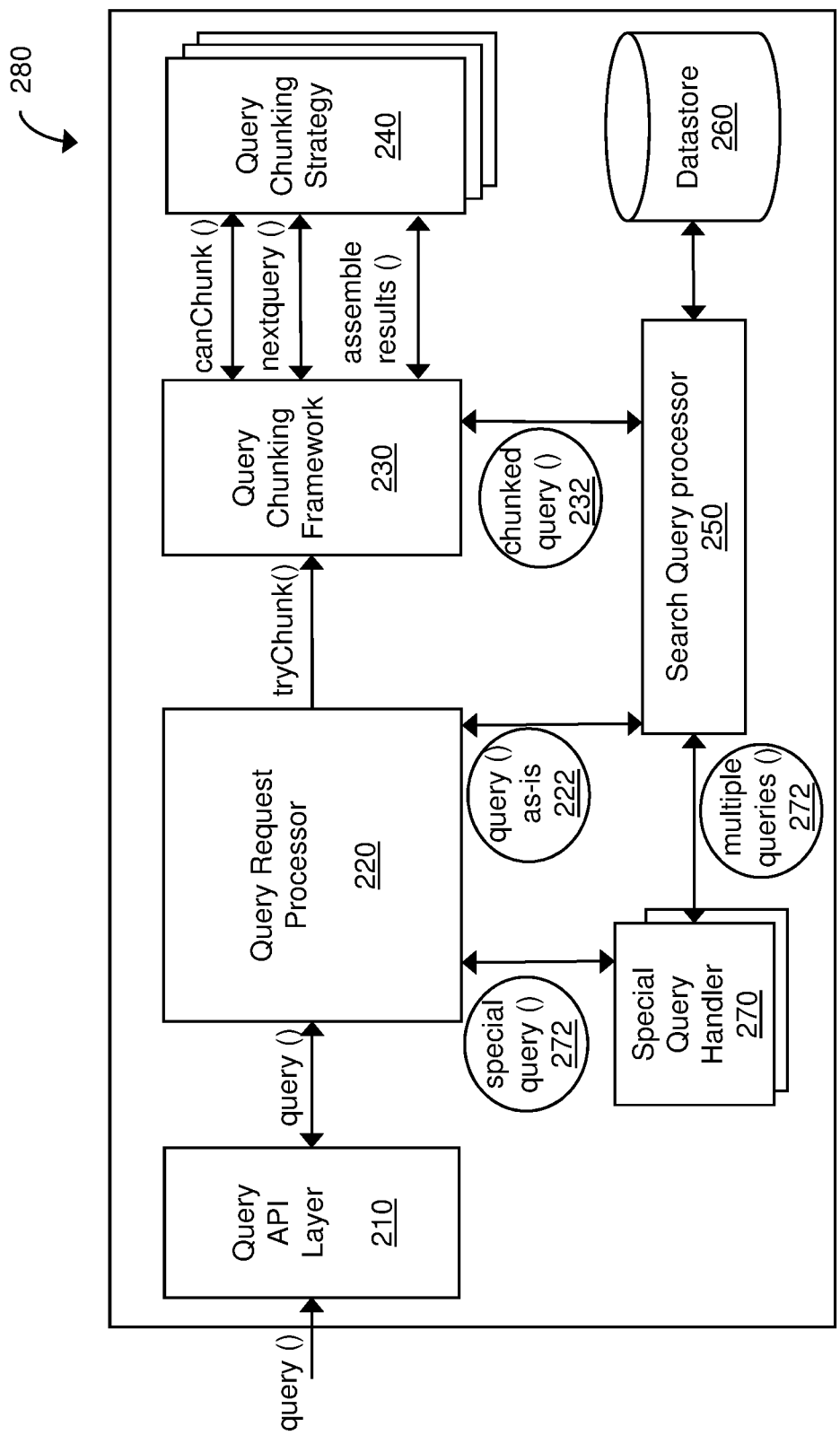

FIGS. 2A and 2B represent exemplary analytics systems 200 and 280 in an application intelligence platform that incorporate query chunking architectures. The analytics systems 200 and 280 incorporate a query chunking architecture to support asynchronous streaming of chunked query results in the controller UI client. As shown in FIG. 2A, the exemplary analytics system 200 receives queries from the controller UI client 202, processes the received queries and displays the results of the processed queries using the processes disclosed in this patent document including processes 100 and 160.

The analytics system 200 includes a query API layer 210, a query request processor 220, a query chunking framework 230, a query chunking strategy 240, a search query processor 250, and a data storage 260 of monitored performance metric data. The query APT layer 210 handles communications with the UI client to receive the queries from the user and sends the received queries to the query request processor 220. The query request processor 220 is responsible for initial handling of the received queries including single vs. multi-query handling breakdown. The query request processor is also responsible for directing the received queries to appropriate backend storage layer for searching for the metrics data requested in the queries. In addition, the query request processor is responsible for directing accumulation and assembly of query results including error results handling. In some implementations, as further described with respect to FIG. 2B below, the query request processor can delegate to a special query handler to process special queries, such as funnel queries, cohort queries, and etc.

The query request processor 220 can send (tryChunk ( )) the received queries to the query chunking framework 230 to determine whether to chunk the received queries. Queries that are not candidates for query chunking (query as-is( )) as determined using processes 100 and 160 (including optional sub-processes) are sent to the search query processor 250 for directing the received queries to appropriate backend storage layers, such as the data storage 260, to search for the metrics data requested in the queries. The data storage 260 is an exemplary backend storage that stores the metrics data to be queried.

The query chunking framework 230 is responsible for determining whether to chunk the received queries using processes 100 and 160 (including optional sub-processes). The query chunking framework 230 coordinates with the query chunking strategy 240 to select the appropriate chunking strategy or a set of strategies, chunk the queries using the selected strategies, and dynamically stream results of the chunks to the UI for display using processes 100 and 160 (including optional sub-processes). Once the chunking strategy or set of strategies have been selected, the query chunking framework 230 can perform processes 100 and 160 in a chunk-execute-assemble (e.g., processes 112, 114, and 116) loop according to the selected strategy or strategies until all of the requested queries are processed. The selected chunking strategy or strategies can return a single query or set of queries to execute together or separately. For example, multiple chunked queries can be executed in sequential single query requests. In some implementations, multiple chunked queries can be executed in parallelized single query requests. In some implementations, multiple chunked queries can be executed in a single multi-query request.

Under the direction of the query chunking framework, the search query processor 250 handles execution of the chunked queries by searching the data storage 260 of metric data. Results of the executed chunked queries are sent back to the query chunking framework to be assembled before dynamically streaming the assembled results for display to the UI client as disclosed in processes 100 and 160.

System 280 is substantially similar to system 200 and includes common components, such as the query API layer 210, the query request processor 220, query chunking framework 230, query chunking strategy 240, search query processor 250, and data storage 260.

Query Chunking Strategies

Figure 3:
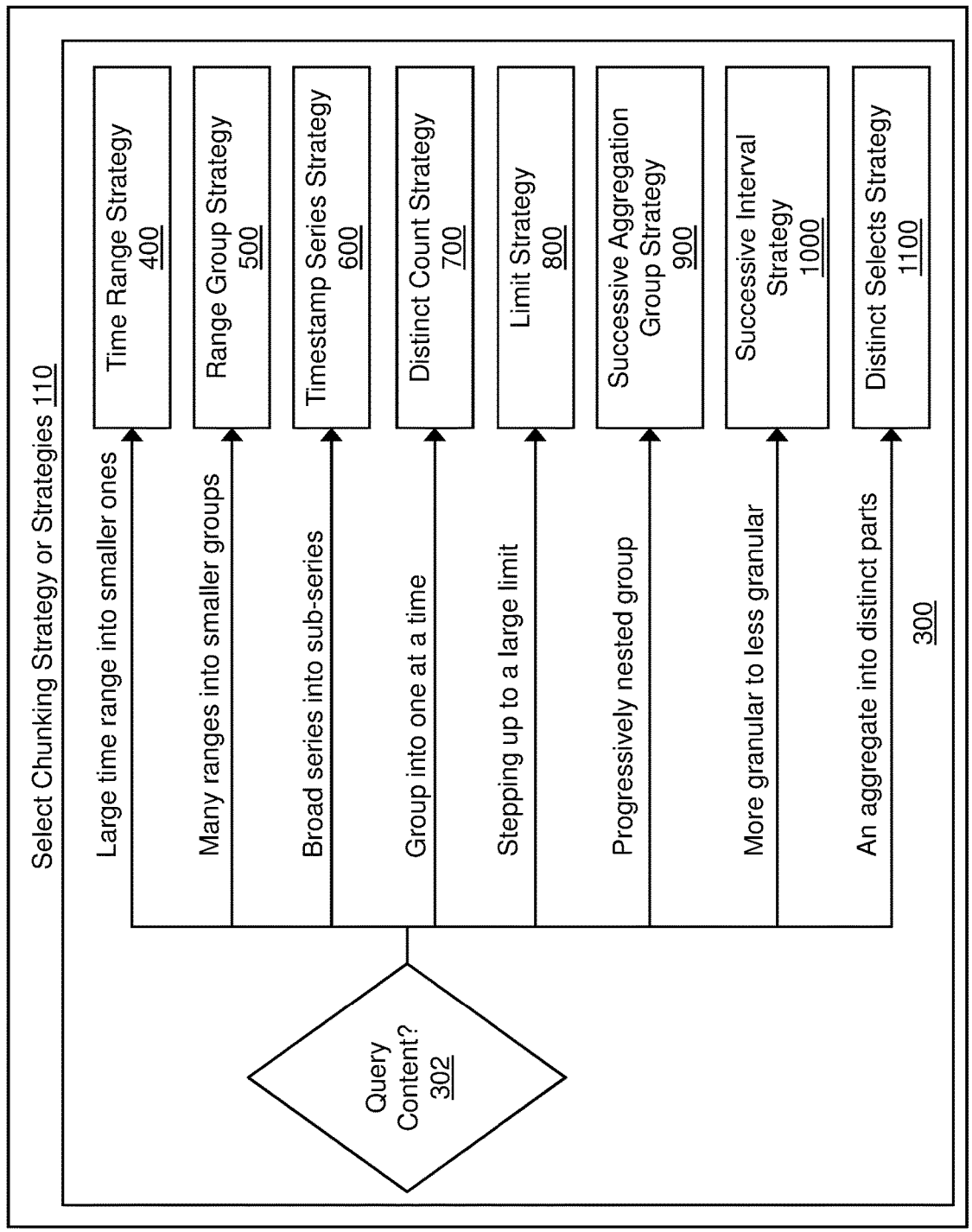
FIG. 3 is a process flow diagram showing a selection process for automatically selecting one of the available query chunking strategies based on the received query.
Figure 4:
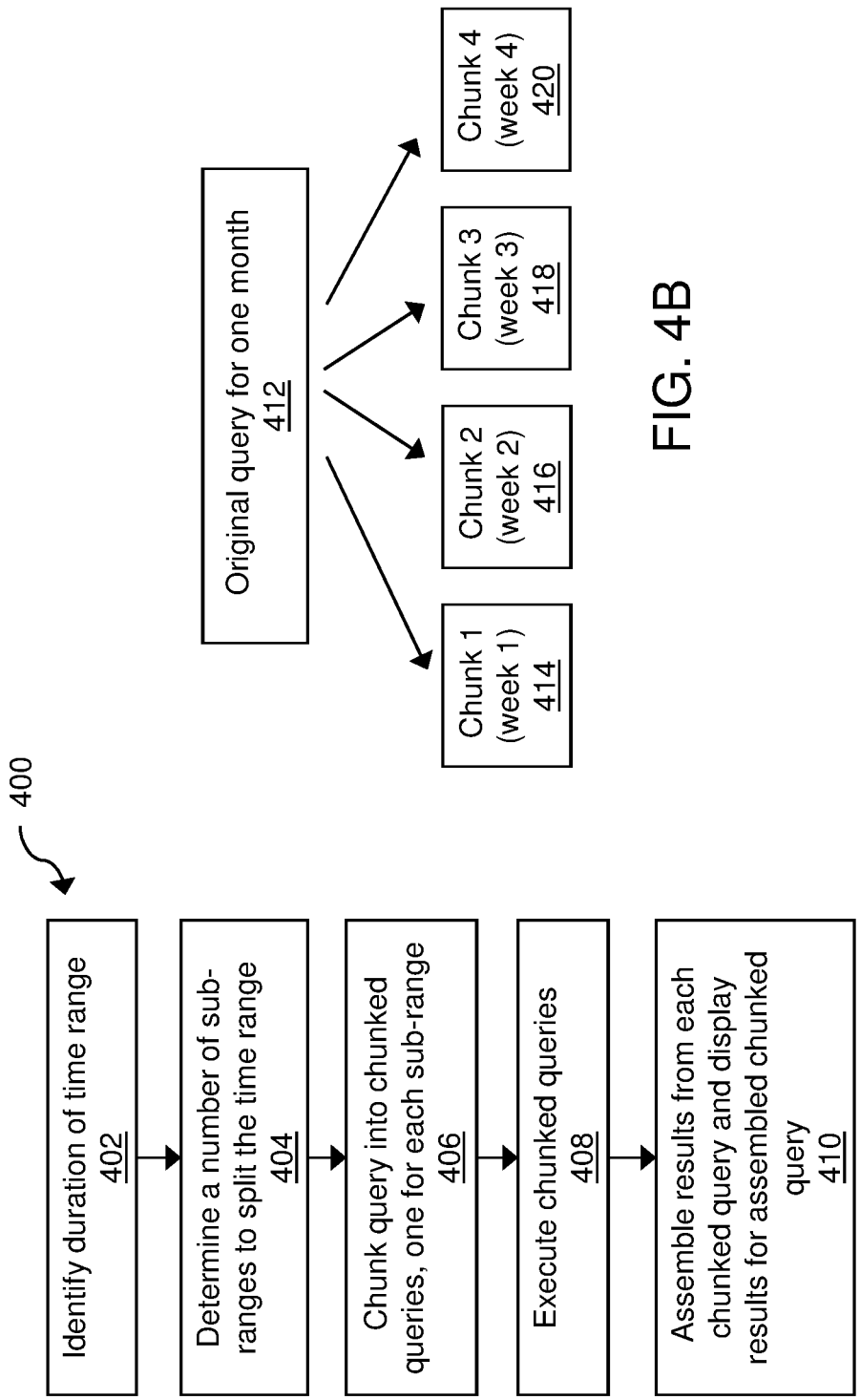
FIG. 4A is a process flow diagram of an exemplary time range strategy.
FIG. 4B is a block diagram of an exemplary implementation of the time range strategy.
Figure 5:
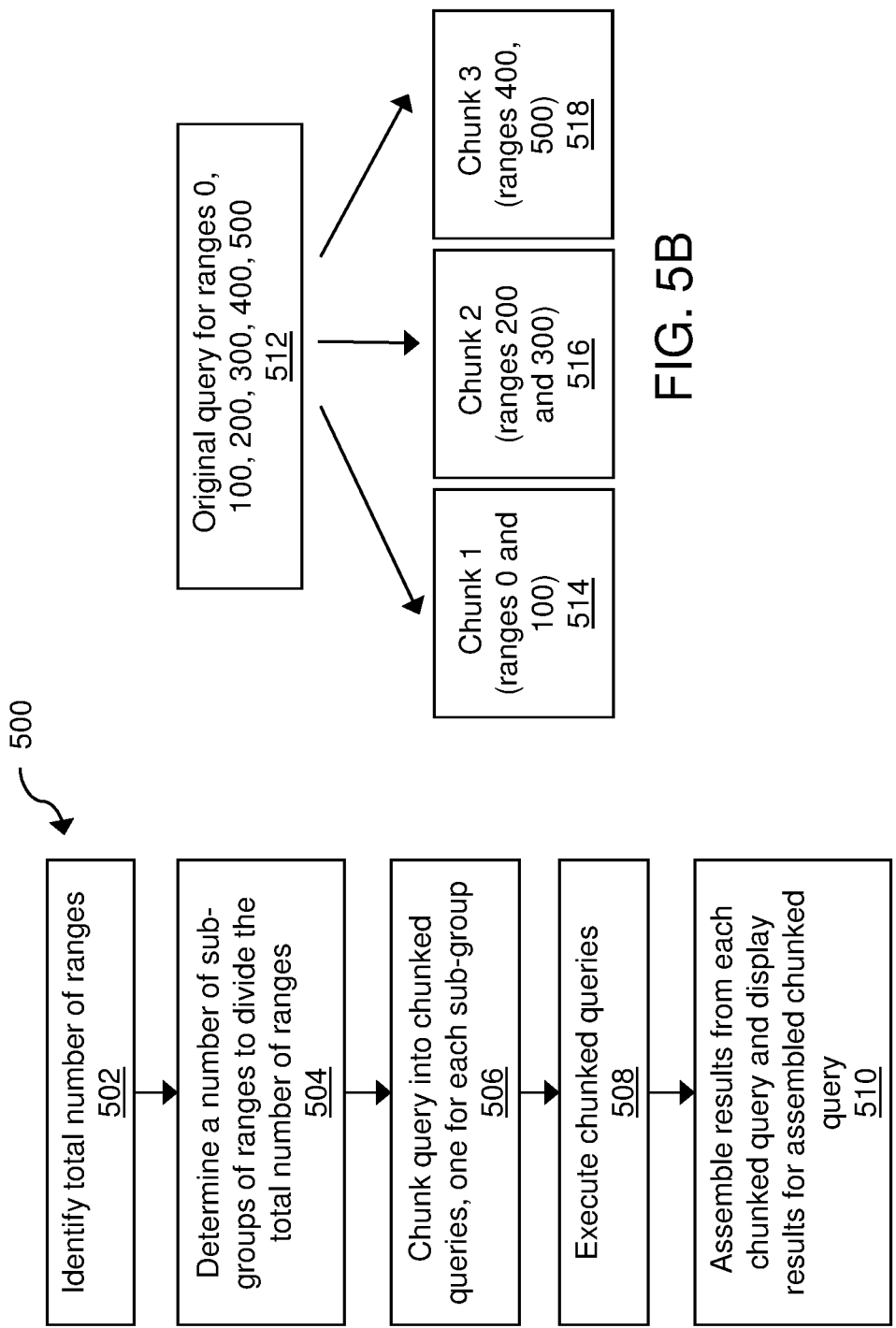
FIG. 5A is a process flow diagram of an exemplary range group strategy.
FIG. 5B is a block diagram of an exemplary implementation of the range group strategy.
Figure 6:
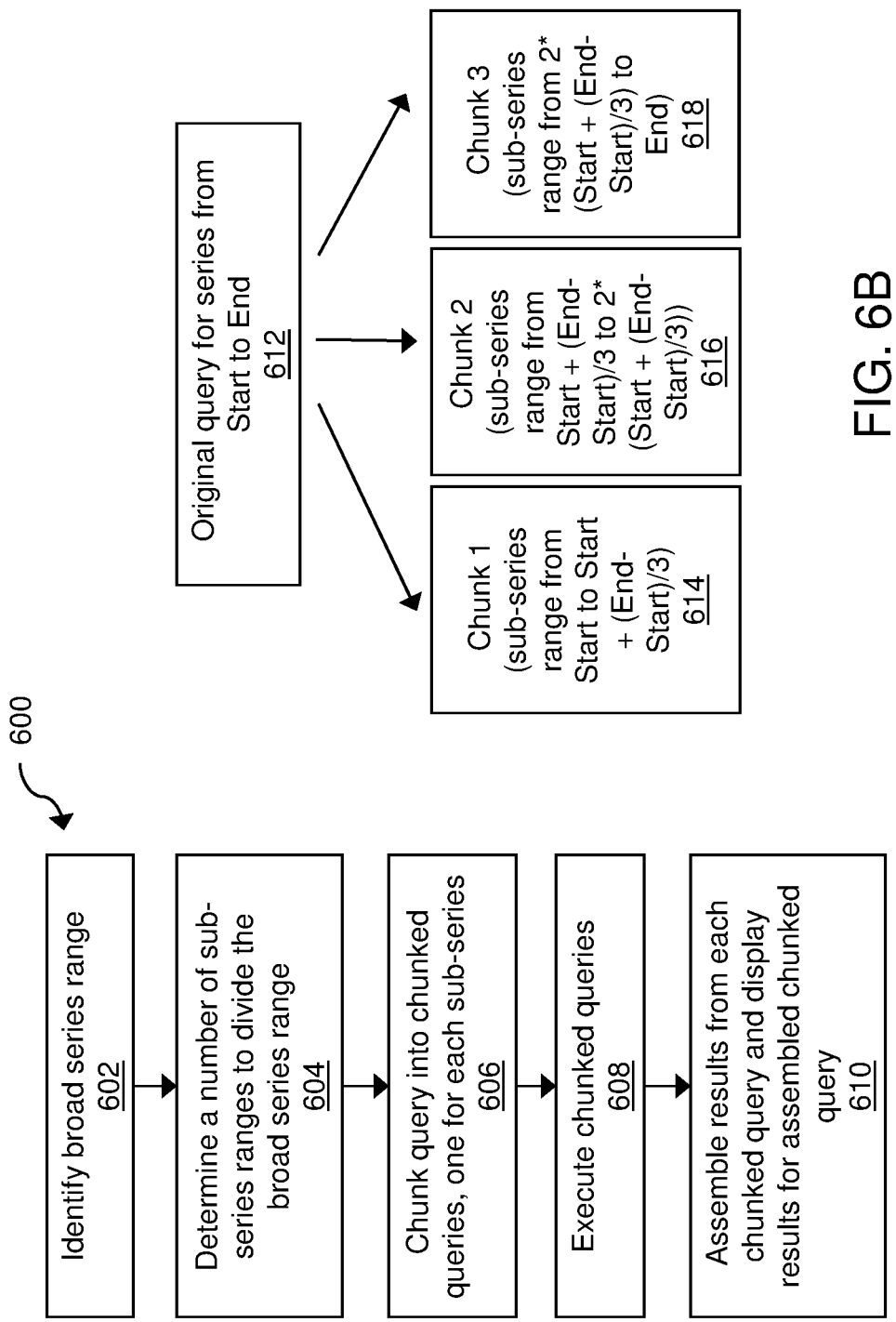
FIG. 6A is a process flow diagram of an exemplary timestamp series strategy.
FIG. 6B is a block diagram of an exemplary implementation of the timestamp series strategy.
Figure 7:
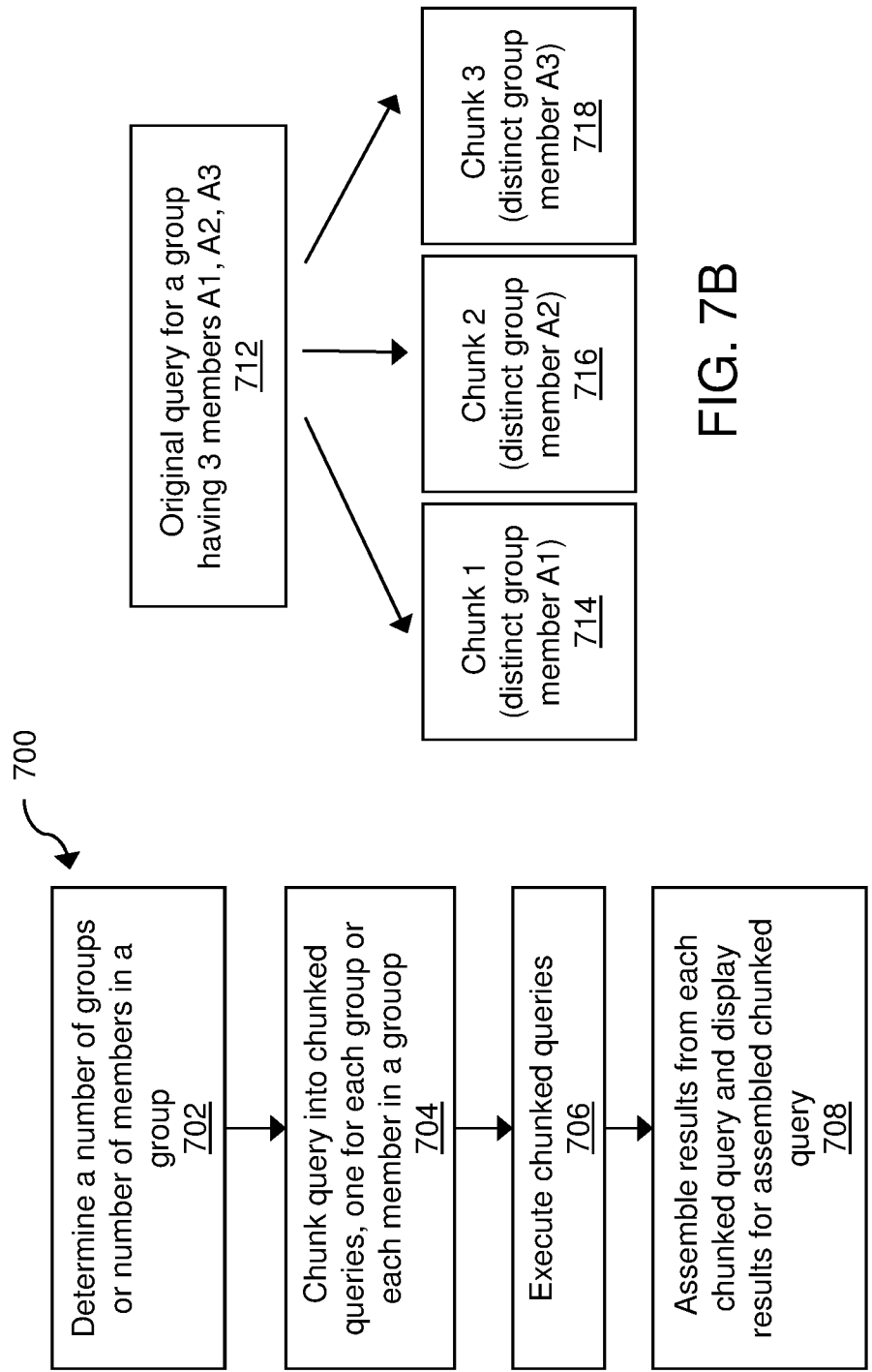
FIG. 7A is a process flow diagram of an exemplary distinct count strategy.
FIG. 7B is a block diagram of an exemplary implementation of the distinct count strategy.
Figure 8:
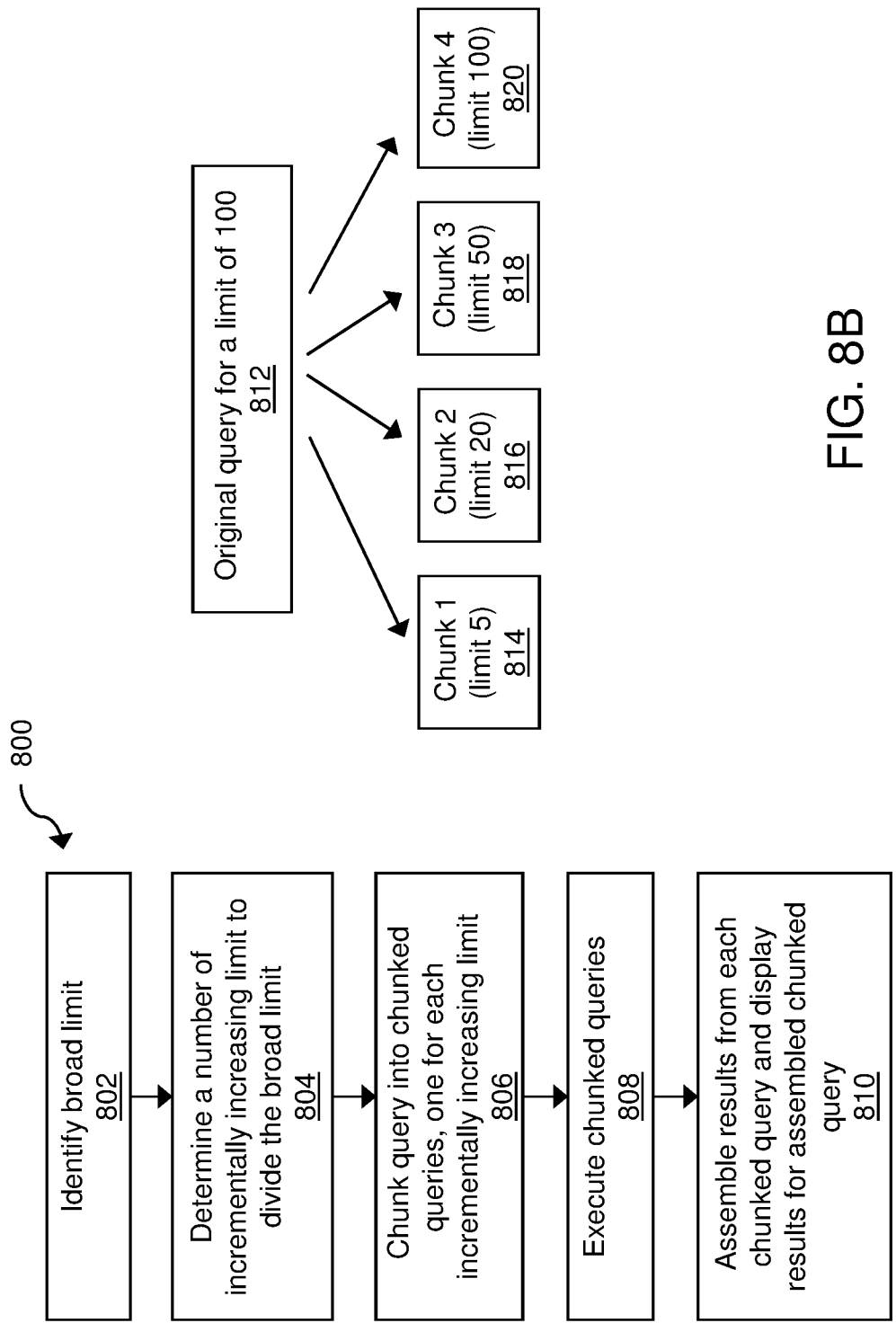
FIG. 8A is a process flow diagram of an exemplary limit strategy.
FIG. 8B is a block diagram of an exemplary implementation of the limit strategy.
Figure 9:
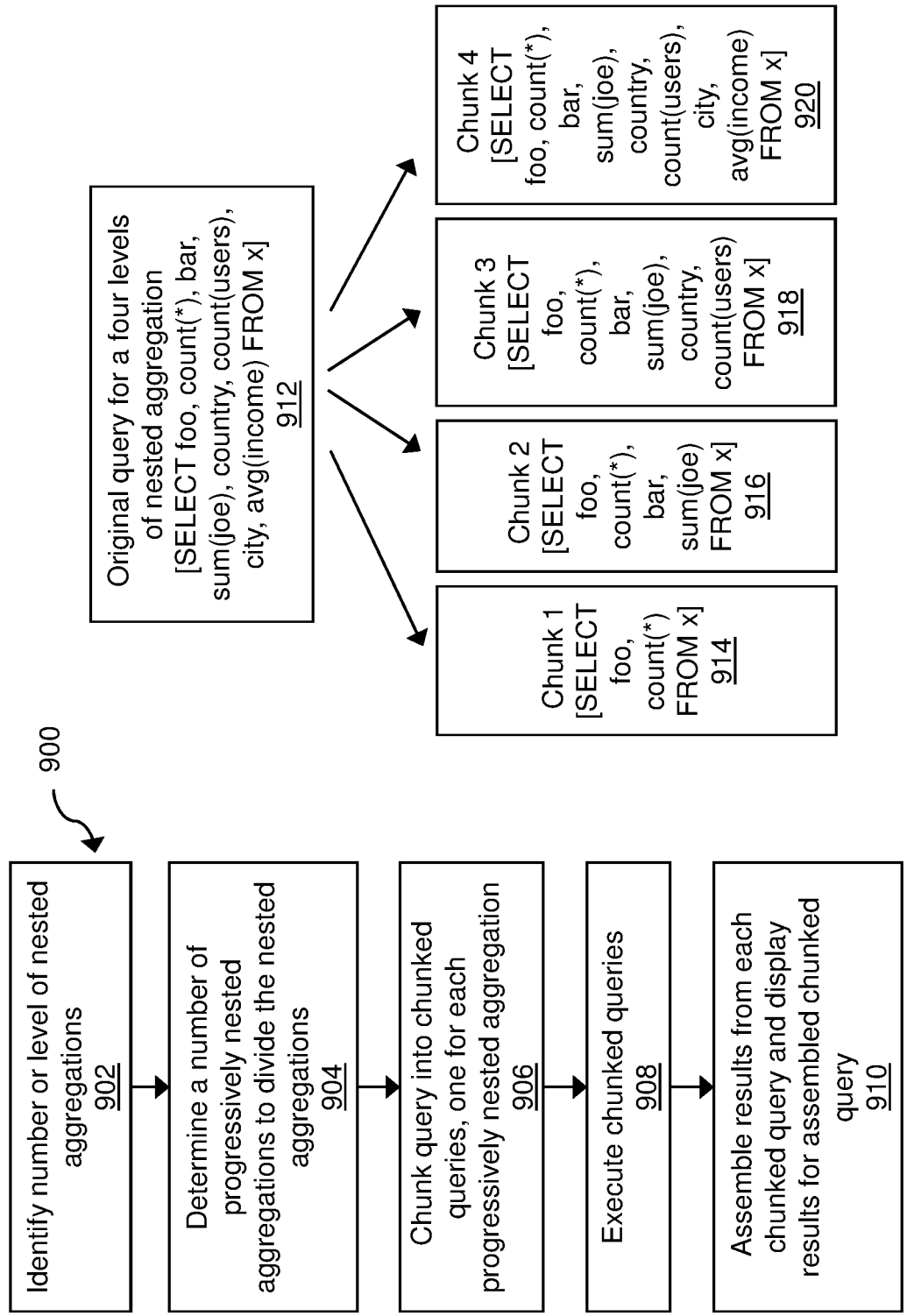
FIG. 9A is a process flow diagram of an exemplary successive aggregation group strategy.
FIG. 9B is a block diagram of an exemplary implementation of the successive aggregation group strategy.
Figure 10:
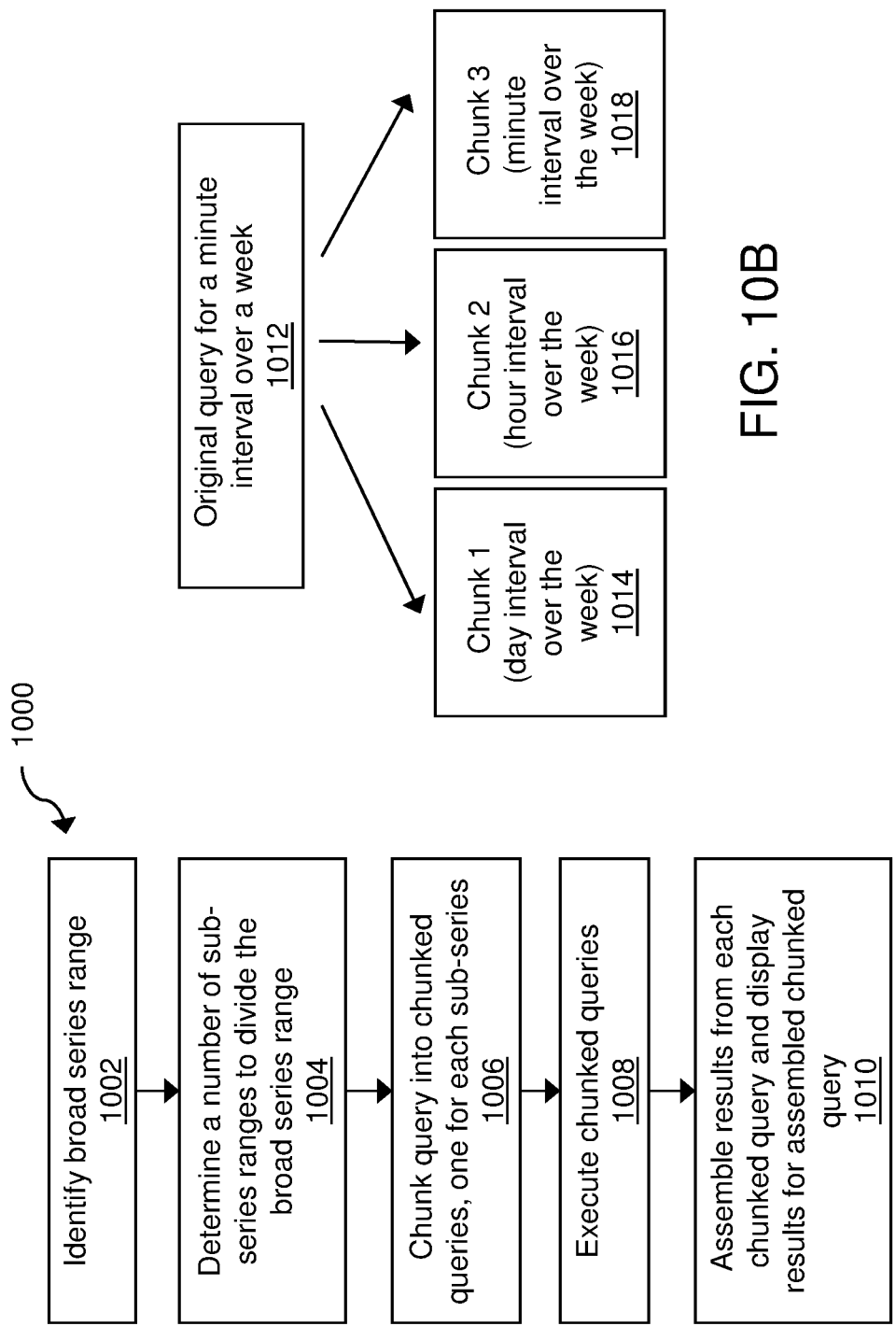
FIG. 10A is a process flow diagram of an exemplary successive interval strategy.
FIG. 10B is a block diagram of an exemplary implementation of the successive interval strategy.
Figure 11:
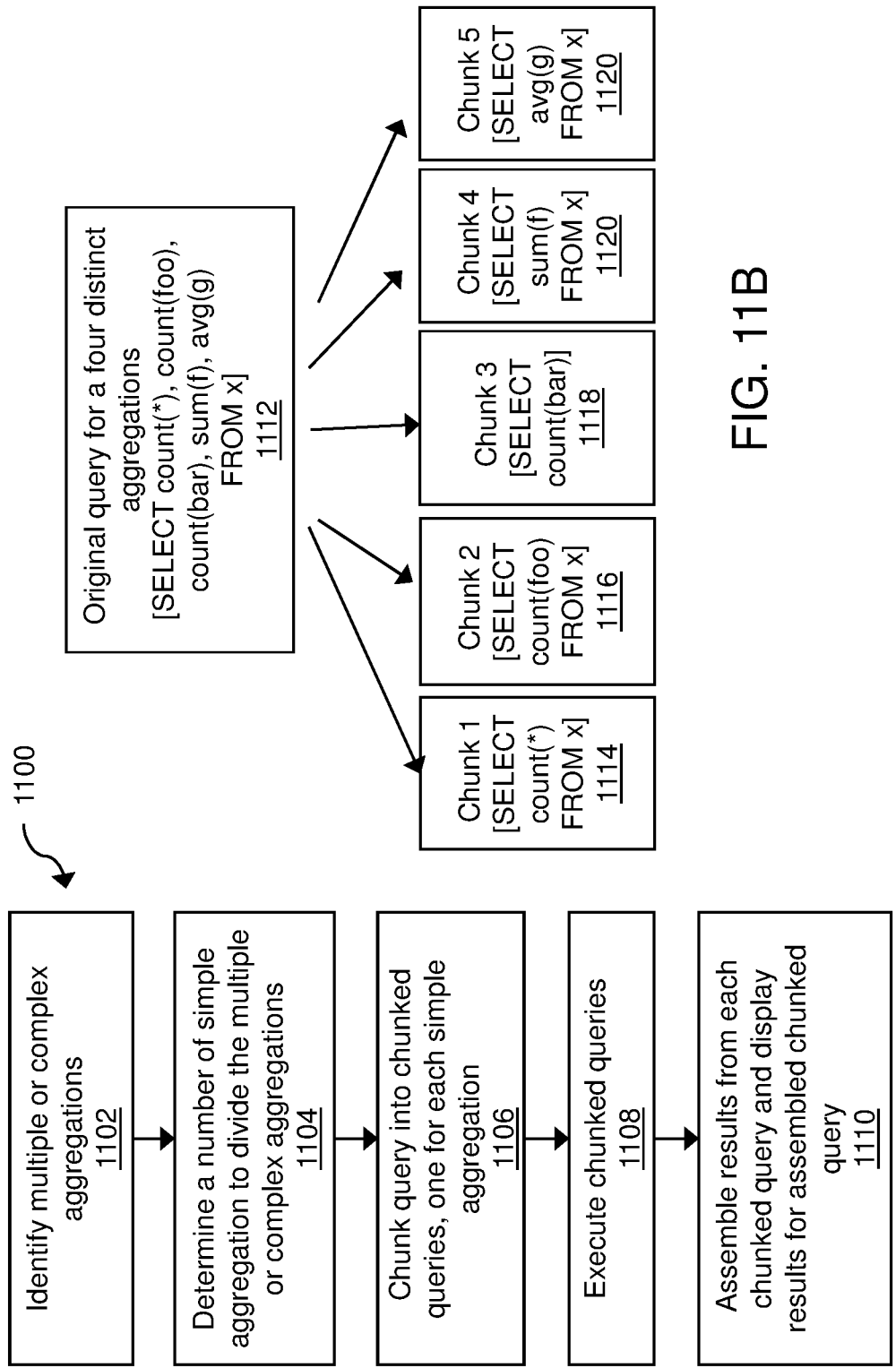
FIG. 11A is a process flow diagram of an exemplary distinct selects strategy.
FIG. 11B is a block diagram of an exemplary implementation of the distinct selects strategy.

As disclosed above with respect to FIGS. 1A, 1B, 1C, 1D, 1E, 1F, 1G, 1H, 1I, 1J, 1K, 2A, and 2B, a number of different query chunking strategies can be selected for chunking the queries. Non-exhaustive examples of query chunking strategies include time range strategy, range group strategy, timestamp series strategy, distinct count strategy, limit strategy, successive aggregation group strategy, successive interval strategy, and distinct selects strategy. In addition, end user can optionally create custom strategies. FIG. 3 is a process flow diagram showing a selection process 300 for automatically selecting one of the available query chunking strategies based on the received query. The selection process 300 can be performed as a part of the select chunking strategy or strategies process 110. FIGS. 4, 5, 6, 7, 8, 9, 10, and 11 illustrate the process flows of these exemplary query chunking strategies.

As shown in FIG. 3, the select chunking strategy or strategies process 110 can include the selection process 300. In some implementations, the selection process 300 can also be part of the identify chunking strategy candidate(s) process 126. The selection process 300 can be used by the query chunking framework 230 in coordination with the query chunking strategy 240 to automatically select a strategy from a group of strategies. The process 300 includes analyzing the content of the query to be chunked at process 302. Based on the content of the query at process 302, one of the groups of strategies can be selected.

For example, when the query is over a large time range crossing many indices, especially hot vs. cold indices, the time range strategy 400 can be selected. Also, the time range strategy 400 can be selected when the query can execute faster in smaller time ranges and the results of the smaller ranges can be assembled together. When the query includes many ranges which can be queried faster in smaller groups of ranges, the range group strategy 500 can be selected. When the query is over a broad timestamp series range that can be queried faster in sub-series ranges, the timestamp series ranges 600 can be selected. When the query is for a group and delivering the results for the group one-by-one rather than all at once, the distinct count strategy 700 can be selected. When the query is over a large limit which performs slower in proportion to the number of results returned, the limit strategy 800 can be selected. When the query includes many nested aggregation groups and returning the results by progressively nested groups, the successive aggregation group strategy 900 can be selected. When the query is for a granular interval and less granular intervals can return results faster, the successive interval strategy 1000 can be selected. When the query includes an aggregate of distinct selections and when some simple aggregations are much more expensive than others, the distinct selects strategy 1100 can be selected FIG. 4A is a process flow diagram of the time range strategy 400. The time range strategy 400 splits the query into successive sub-ranges based on the time range of the query. The sub-ranges are informed by tiering metadata, such as an index associated with particular time ranges and a uniform or linear distribution, such as days of a week, weeks of a month, months of a year, etc. The duration of the time range in the original query is identified at process 402. Based on the duration of the time range, a number of sub-ranges to split the time range is determined at process 404. The original query is chunked into chunked queries with the total number of chunked queries matching the number of sub-ranges at process 406. The chunked queries are executed at process 408. Results of the chunked queries are assembled and displayed to the user via the UI client at process 410. As the execution of each chunked query completes, the results are assembled together with the results from previously completed chunked query or queries. Each time additional results from additional chunked query are returned, the displayed data is updated appropriately.

For example, a query 412 over a time range of one month can be chunked into four chunked queries 414, 416, 418, 420 over four successive one week sub-ranges as shown in FIG. 4B. The results of each chunked query are assembled together appropriately by stitching together the four successive one week sub-ranges. In some implementations, the same query over a time range of one month can be chunked into four chunked queries over four successive one week sub-ranges plus one chunked query for the entire month (i.e., full time range query). By running the full time range query as the last chunked query, the four sub-range queries need not be assembled together. The overall results can be displayed when the full range query is executed. User experience is satisfactory because each sub-range results can be displayed to the user while the full range query is executing.

FIG. 5A is a process flow diagram of the range group strategy 500. The range group strategy 500 splits a query that includes multiple ranges into sub-groups that include only few of the ranges. The total number of ranges in the original query is identified at process 502. Based on the total number of ranges, a number of sub-groups of ranges to divide the total number of ranges is determined at process 504. The original query is chunked into chunked queries with the total number of chunked queries matching the number of sub-groups at process 506. The chunked queries are executed at process 508. Results of the chunked queries are assembled and displayed to the user via the UI client at process 510. As the execution of each chunked query completes, the results are assembled together with the results from previously completed chunked query or queries. Each time additional results from additional chunked query are returned, the displayed data is updated appropriately.

For example, a query 512 that includes six ranges, such as 0, 100, 200, 300, 400, and 500 can be chunked into three chunked queries 514, 516, 518 having two of the six ranges in each chunked query as shown in FIG. 5B. Depending on the number of ranges in the query, the total number of chunked queries and the number of ranges included in each chunked query can vary to enhance the processing time of each chunk. The results are resulted for each range in the group of ranges as each chunked query is executed.

FIG. 6A is a process flow diagram of the timestamp series strategy 600. The timestamp series strategy 600 splits a query that expands a broad series range into multiple sub-series ranges. The broad series of range in the original query is identified at process 602. Based on the broad series of range in the query, a number of sub-series of ranges to divide the broad series of range is determined at process 604. The original query is chunked into chunked queries with the total number of chunked queries matching the number of sub-series of ranges at process 606. The chunked queries are executed at process 608. Results of the chunked queries are assembled and displayed to the user via the UI client at process 610. As the execution of each chunked query completes, the results are assembled together with the results from previously completed chunked query or queries. Each time additional results from additional chunked query are returned, the displayed data is updated appropriately.

For example, a query 612 that expands a broad series range from Start to End as shown in FIG. 6B can be chunked into three chunked queries 614, 616, 618 of three sub-series ranges by dividing the range of query 612 from start to end into three sequential parts: (1) from Start to Start+(End−Start)/3; (2) from Start+(End—Start)/3 to 2*(Start+(End−Start)/3); and (3) 2*(Start+(End−Start)/3) to End. Depending on the broadness of the series range in the query, the total number of chunked queries and the length of the sub-series range included in each chunked query can vary to enhance the processing time of each chunk. Results are displayed for each sub-range one at a time with any stitching of series as necessary.

FIG. 7A is a process flow diagram of the distinct count strategy 700. The distinct count strategy 700 splits a query that requests data for a large group into chunked queries for individual member of the group to return results one member at a time. Similarly, the distinct count strategy 700 splits a query that requests data from a large number of groups into chunked queries for individual distinct group to return results one distinct group at a time. The number of members in a group or the total number of groups in the original query is identified at process 702. The original query is chunked into chunked queries with the total number of chunked queries matching the number of members in the group or the number of groups at process 704. The chunked queries are executed at process 706. Results of the chunked queries are assembled and displayed to the user via the UI client at process 708. As the execution of each chunked query completes, the results are assembled together with the results from previously completed chunked query or queries.

Each time additional results from additional chunked query are returned, the displayed data is updated appropriately.

For example, a query 712 that requests data for a group A that includes three members A1, A2, and A3, is chunked into three chunked queries 714, 716, 718 that request data for each group members A1, A2, and A3 as shown in FIG. 7B. Depending on the number of groups or members in a group included in the query, the total number of chunked queries can vary to enhance the processing time of each chunk. Results are displayed for each distinct group or group member one at a time.

FIG. 8A is a process flow diagram of the limit strategy 800. The limit strategy 800 splits a query that requests data up to a large limit into chunked queries for incrementally increasing limits. The broad limit in the original query is identified at process 802. Based on the broad limit in the query, a number of incrementally increasing limits to divide the broad limit is determined at process 804. The original query is chunked into chunked queries with the total number of chunked queries matching the number of incrementally increasing limits at process 806. The chunked queries are executed at process 808. Results of the chunked queries are assembled and displayed to the user via the UI client at process 810. As the execution of each chunked query completes, the results are assembled together with the results from previously completed chunked query or queries. Each time additional results from additional chunked query are returned, the displayed data is updated appropriately.

For example, for a query 812 that has a limit of 100 can be chunked into four chunked queries 814, 816, 818, 820 with incrementally increasing limits of 5, 20, 50, and 100 as shown in FIG. 8B. Depending on the original limit in the query, the total number of chunked queries and the incrementally increasing limits included in each chunked query can vary to enhance the processing time of each chunk. The results are displayed for each chunked query executed and the user sees an increasing list of results displayed.

FIG. 9A is a process flow diagram of the successive aggregation group strategy 900. The successive aggregation group strategy 900 splits a query that includes many nested aggregation groups into chunked queries of progressively nested group. The number or level of nested aggregations in the original query is identified at process 902. Based on the number or level of nested aggregation in the query, a number of progressively nested aggregations to divide the nested aggregation is determined at process 904. The original query is chunked into chunked queries with the total number of chunked queries matching the number or level of nested aggregation at process 906. The chunked queries are executed at process 908. Results of the chunked queries are assembled and displayed to the user via the UI client at process 910. As the execution of each chunked query completes, the results are assembled together with the results from previously completed chunked query or queries. Each time additional results from additional chunked query are returned, the displayed data is updated appropriately.

For example, a query 912 that includes four nested aggregation groups can be chunked into four chunked queries 914, 916, 918, 920 of progressively nested group as shown in FIG. 9B. Depending on the number or level of nested aggregation groups in the query, the total number of chunked queries and the progressively nested group included in each chunked query can vary to enhance the processing time of each chunk. The results are displayed for each chunked query executed and the user sees an increasing number of columns of data or a visualization of coarser to more fine grain results.

FIG. 10A is a process flow diagram of the successive interval strategy 1000. The successive interval strategy 1000 splits a query that requests a granular interval over a range into chunked queries for the same range but for less granularity with each successive chunks. The granularity of interval in the original query is identified at process 1002. Based on the granularity of interval in the query, a number of granularity levels to divide the granular interval (from coarse to fine) in the original query is determined at process 1004. The original query is chunked into chunked queries with the total number of chunked queries matching the number of granularity levels at process 1006. The chunked queries are executed at process 1008. Results of the chunked queries are assembled and displayed to the user via the UI client at process 1010. As the execution of each chunked query completes, the results are assembled together with the results from previously completed chunked query or queries. Each time additional results from additional chunked query are returned, the displayed data is updated appropriately.

For example, a query 1012 that requests a minute interval data for a week can be chunked into three progressively granular chunked queries 1014, 1016, 1018 of day interval, hour interval, and then minute interval as shown in FIG. 10B. Depending on the granularity of the interval requested in the query, the total number of chunked queries and the corresponding granularities can vary to enhance the processing time of each chunk. The results for each chunked query executed are displayed so that the user experiences increasing refinement or granularity in the displayed result.

FIG. 11A is a process flow diagram of the distinct selects strategy 1100. The distinct selects strategy 1100 splits a query that includes multiple or complex aggregations into chunked queries of simple or distinct aggregations. The multiple or complex aggregation in the original query is identified at process 1102. Based on the multiple or complex aggregation in the query, a number of simple distinct aggregations to divide the granular interval in the original query is determined at process 1104. The original query is chunked into chunked queries with the total number of chunked queries matching the number of simple distinct aggregations at process 1106. The chunked queries are executed at process 1108. Results of the chunked queries are assembled and displayed to the user via the UI client at process 1110. As the execution of each chunked query completes, the results are assembled together with the results from previously completed chunked query or queries. Each time additional results from additional chunked query are returned, the displayed data is updated appropriately.

For example, a query 1112 that requests five different aggregated groups of distinct data can be chunked into five chunked queries 1114, 1116, 1118, 1120, 1122 of distinct data as shown in FIG. 11B. Depending on the total number of distinct groups aggregated in the query, the total number of chunked queries can vary to enhance the processing time of each chunk. The results for each chunked query executed are displayed so that the user experiences progressive results displayed.

In some implementations, more than one of the chunk query strategies can be combined together to chunk a query depending on the nature and content of the query. For all query chunking strategies, the chunked queries can be executed sequentially or in parallel or a combination of sequential and parallel executions. In some implementations, the chunked queries can be executed in groups.

Exemplary Advantages

The disclosed technology for query chunking is compatible with any back end data store, such as ES, SQL, Cassandra, Mongo, etc. The disclosed technology for query chunking is highly flexible to optimize the particular chunking strategy around the particulars of the requested query that are most important. The disclosed technology for query chunking is dynamic in that as the chunked queries are executed, the performance of the query chunking strategies can be determined against the expected or predicted performance, and then adjust subsequent chunk queries in response to optimize for the end user experience. The disclosed technology for query chunking is transparent to the end user, and can operate without user input or knowledge of the chunking.

Application Intelligence Platform Architecture

Figure 12:
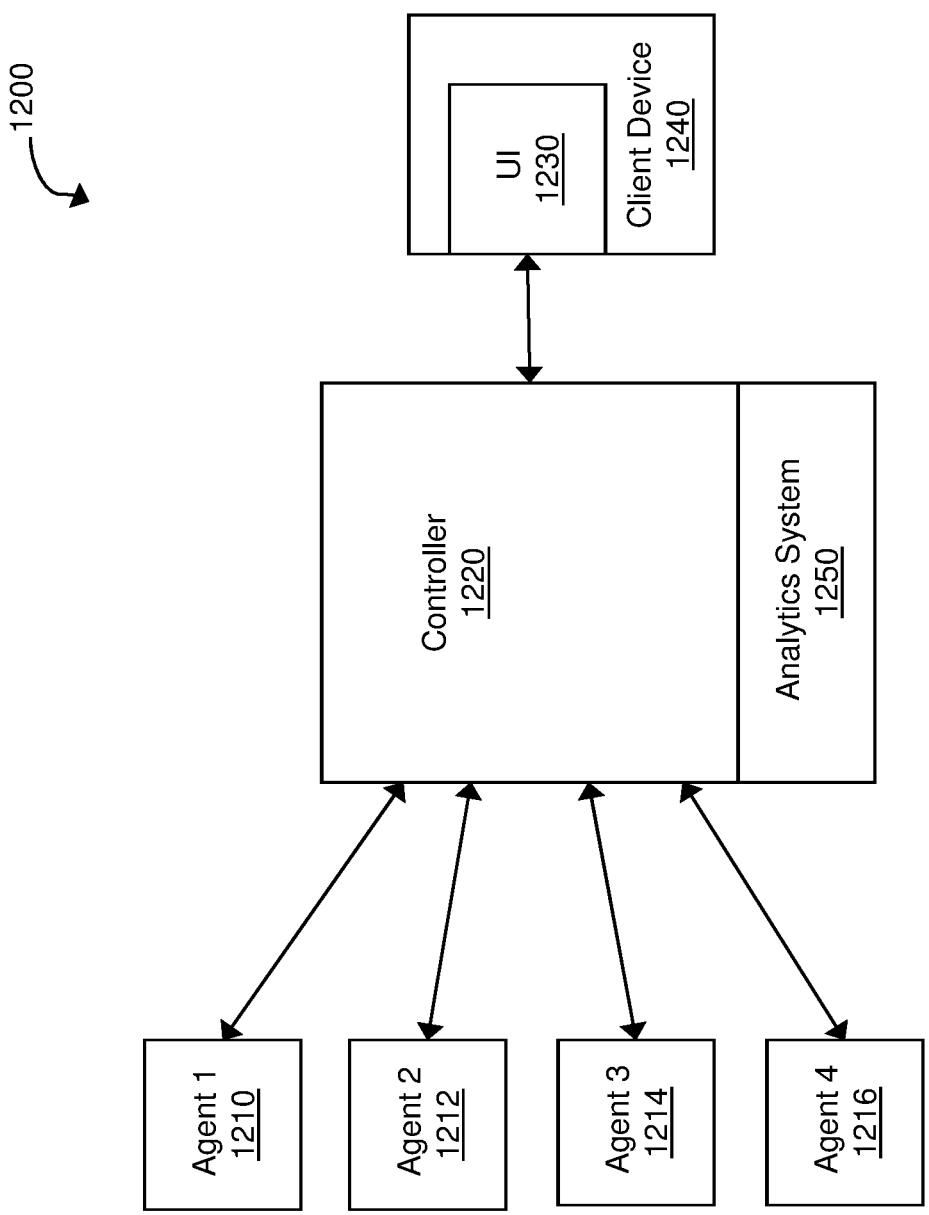
FIG. 12 is a block diagram of an exemplary application intelligence platform that can implement the query chunking as disclosed in this patent document.

FIG. 12 is a block diagram of an exemplary application intelligence platform 1200 that can implement the query chunking as disclosed in this patent document. The application intelligence platform is a system that monitors and collect metrics of performance data for an application environment being monitored. At the simplest structure, the application intelligence platform includes one or more agents 1210, 1212, 1214, 1216 and one or more controllers 1220. While FIG. 12 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 1220 is the central processing and administration server for the application intelligence platform. The controller 1220 serves a browser-based user interface (UI) 1230 that is the primary interface for monitoring, analyzing, and troubleshooting the monitored environment. The controller 1220 can control and manage monitoring of business transactions distributed over application servers. Specifically, the controller 1220 can receive runtime data from agents 1210, 1212, 1214, 1216 and coordinators, associate portions of business transaction data, communicate with agents to configure collection of runtime data, and provide performance data and reporting through the interface 1230. The interface 1230 may be viewed as a web-based interface viewable by a client device 1240. In some implementations, a client device 1240 can directly communicate with controller 1220 to view an interface for monitoring data.

In the Software as as Service (SaaS) implementation, a controller instance 1220 is hosted remotely by a provider of the application intelligence platform 1200. In the on-premise (On-Prem) implementation, a controller instance 1220 is installed locally and self-administered.

The controllers 1220 receive data from different agents 1210, 1212, 1214, 1216 deployed to monitor applications, databases and database servers, servers, and end user clients for the monitored environment. Any of the agents 1210, 1212, 1214, 1216 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 1220 can include an analytics system 1250 for performing the dynamic query chunking and streaming of results as disclosed in this patent document. The analytics system 1250 can be implemented to be substantially similar to the analytics system 200 and 280 disclosed with respect to FIGS. 2A and 2B. In some implementations, the analytics system 1250, 200, and 280 can be implemented in a separate machine (e.g., a server) different from the one hosting the controller 1220.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier, and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows between tiers and can be visualized in a flow map using lines between tiers. In addition, the lines indicating the traffic flows between tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 13:
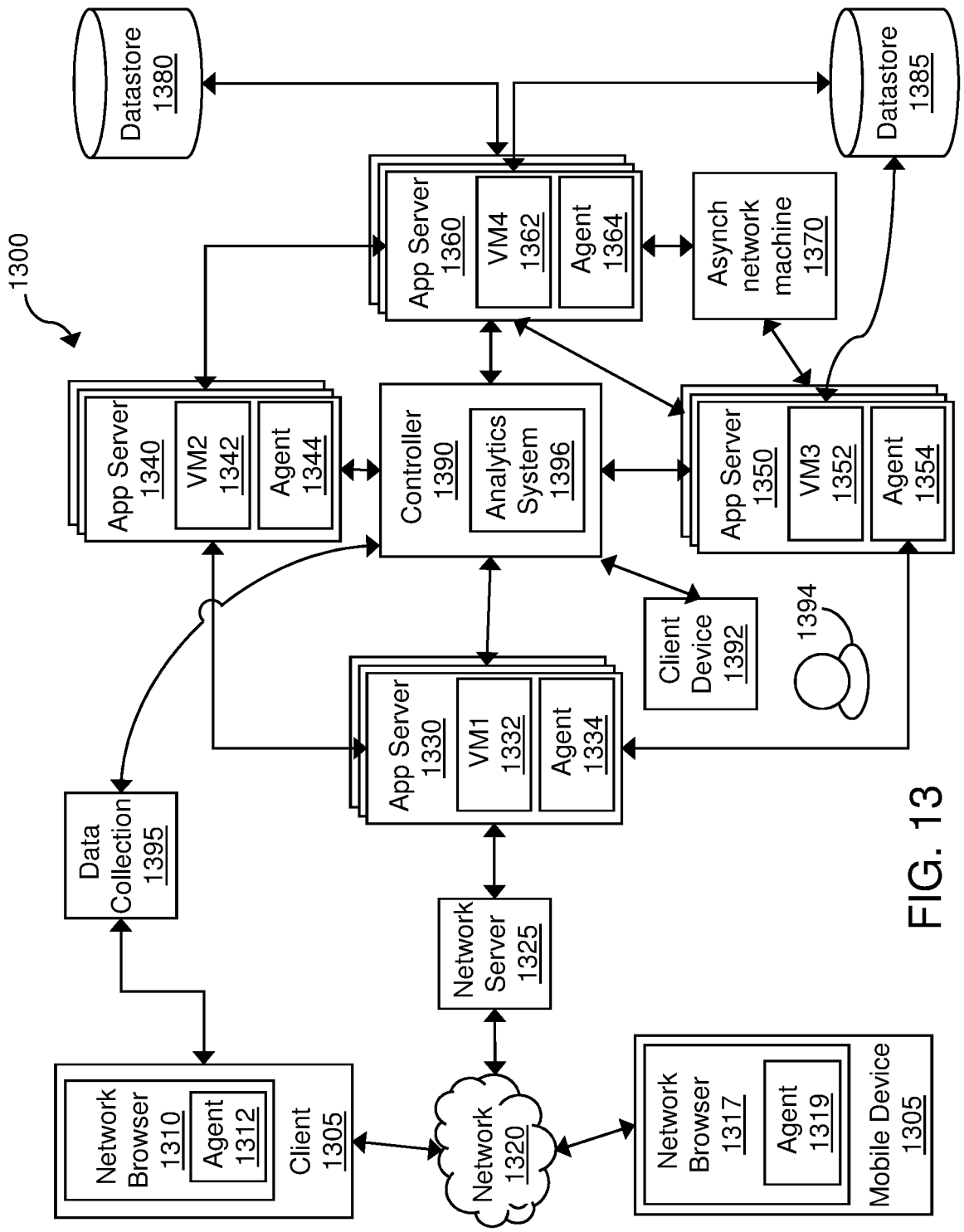
FIG. 13 is a block diagram of an exemplary system for dynamically chunking queries and streaming results of chunked queries as disclosed in this patent document, including the processes disclosed with respect to FIGS. 1-12.

FIG. 13 is a block diagram of an exemplary system 1300 for dynamically chunking queries and streaming results of chunked queries as disclosed in this patent document, including the processes disclosed with respect to FIGS. 1-12B. The system 1300 in FIG. 13 includes client device 1305 and 1392, mobile device 1315, network 1320, network server 1325, application servers 1330, 1340, 1350 and 1360, asynchronous network machine 1370, data stores 1380 and 1385, controller 1390, and data collection server 1395. The controller 1390 can include an analytics system 1396 for performing dynamic query chunking and streaming of chunked query results as disclosed in this patent document. The analytics system 1396 can be implemented to be substantially similar to the analytics system 200 and 280 disclosed with respect to FIGS. 2A and 2B. In some implementations, the analytics system 1396, 200, and 280 can be implemented in a separate machine (e.g., a server) different from the one hosting the controller 1390.

Client device 1305 may include network browser 1310 and be implemented as a computing device, such as for example a laptop, desktop, workstation, or some other computing device. Network browser 1310 may be a client application for viewing content provided by an application server, such as application server 1330 via network server 1325 over network 1320.

Network browser 1310 may include agent 1312. Agent 1312 may be installed on network browser 1310 and/or client 1305 as a network browser add-on, downloading the application to the server, or in some other manner. Agent 1312 may be executed to monitor network browser 1310, the operating system of client 1305, and any other application, API, or other component of client 1305. Agent 1312 may determine network browser navigation timing metrics, access browser cookies, monitor code, and transmit data to data collection 1360, controller 1390, or another device. Agent 1312 may perform other operations related to monitoring a request or a network at client 1305 as discussed herein.

Mobile device 1315 is connected to network 1320 and may be implemented as a portable device suitable for sending and receiving content over a network, such as for example a mobile phone, smart phone, tablet computer, or other portable device. Both client device 1305 and mobile device 1315 may include hardware and/or software configured to access a web service provided by network server 1325.

Mobile device 1315 may include network browser 1317 and an agent 1319. Mobile device may also include client applications and other code that may be monitored by agent 1319. Agent 1319 may reside in and/or communicate with network browser 1317, as well as communicate with other applications, an operating system, APIs and other hardware and software on mobile device 1315. Agent 1319 may have similar functionality as that described herein for agent 1312 on client 1305, and may repot data to data collection server 1360 and/or controller 1390.

Network 1320 may facilitate communication of data between different servers, devices and machines of system 1300 (some connections shown with lines to network 1320, some not shown). The network may be implemented as a private network, public network, intranet, the Internet, a cellular network, Wi-Fi network, VoIP network, or a combination of one or more of these networks. The network 1320 may include one or more machines such as load balance machines and other machines.

Network server 1325 is connected to network 1320 and may receive and process requests received over network 1320. Network server 1325 may be implemented as one or more servers implementing a network service, and may be implemented on the same machine as application server 1330 or one or more separate machines. When network 1320 is the Internet, network server 1325 may be implemented as a web server.

Application server 1330 communicates with network server 1325, application servers 1340 and 1350, and controller 1390. Application server 130 may also communicate with other machines and devices (not illustrated in FIG. 13). Application server 1330 may host an application or portions of a distributed application. The host application 1332 may be in one of many platforms, such as including a Java, PHP, .Net, and Node.JS, be implemented as a Java virtual machine, or include some other host type. Application server 130 may also include one or more agents 134 (i.e. "modules"), including a language agent, machine agent, and network agent, and other software modules. Application server 1330 may be implemented as one server or multiple servers as illustrated in FIG. 13.

Application 1332 and other software on application server 1330 may be instrumented using byte code insertion, or byte code instrumentation (BCI), to modify the object code of the application or other software. The instrumented object code may include code used to detect calls received by application 1332, calls sent by application 1332, and communicate with agent 1334 during execution of the application. BCI may also be used to monitor one or more sockets of the application and/or application server in order to monitor the socket and capture packets coming over the socket.

In some embodiments, server 1330 may include applications and/or code other than a virtual machine. For example, servers 1330, 1340, 1350, and 1360 may each include Java code, .Net code, PHP code, Ruby code, C code, C++ or other binary code to implement applications and process requests received from a remote source. References to a virtual machine with respect to an application server are intended to be for exemplary purposes only.

Agents 1334 on application server 1330 may be installed, downloaded, embedded, or otherwise provided on application server 1330. For example, agents 1334 may be provided in server 1330 by instrumentation of object code, downloading the agents to the server, or in some other manner. Agent 1334 may be executed to monitor application server 1330, monitor code running in a virtual machine 1332 (or other program language, such as a PHP, .Net, or C program), machine resources, network layer data, and communicate with byte instrumented code on application server 1330 and one or more applications on application server 1330.

Each of agents 1334, 1344, 1354 and 1364 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 1334 may detect operations such as receiving calls and sending requests by application server 1330, resource usage, and incoming packets. Agent 134 may receive data, process the data, for example by aggregating data into metrics, and transmit the data and/or metrics to controller 1390. Agent 1334 may perform other operations related to monitoring applications and application server 1330 as discussed herein. For example, agent 1334 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth. The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 1390 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 1334 may create a request identifier for a request received by server 1330 (for example, a request received by a client 1305 or 1315 associated with a user or another source). The request identifier may be sent to client 1305 or mobile device 1315, whichever device sent the request. In embodiments, the request identifier may be created when a data is collected and analyzed for a particular business transaction.

Each of application servers 1340, 1350 and 1360 may include an application and agents. Each application may run on the corresponding application server. Each of applications 1342, 1352 and 1362 on application servers 1340-1360 may operate similarly to application 1332 and perform at least a portion of a distributed business transaction. Agents 1344, 1354 and 1364 may monitor applications 1342-1362, collect and process data at runtime, and communicate with controller 1390. The applications 1332, 1342, 1352 and 1362 may communicate with each other as part of performing a distributed transaction. In particular, each application may call any application or method of another virtual machine.

Asynchronous network machine 1370 may engage in asynchronous communications with one or more application servers, such as application server 1350 and 1360. For example, application server 150 may transmit several calls or messages to an asynchronous network machine. Rather than communicate back to application server 1350, the asynchronous network machine may process the messages and eventually provide a response, such as a processed message, to application server 1360. Because there is no return message from the asynchronous network machine to application server 1350, the communications between them are asynchronous.

Data stores 1380 and 1385 may each be accessed by application servers such as application server 1350. Data store 1385 may also be accessed by application server 1350. Each of data stores 1380 and 1385 may store data, process data, and return queries received from an application server. Each of data stores 1380 and 1385 may or may not include an agent.

Controller 1390 may control and manage monitoring of business transactions distributed over application servers 1330-1360. In some embodiments, controller 1390 may receive application data, including data associated with monitoring client requests at client 1305 and mobile device 1315, from data collection server 1360. In some embodiments, controller 1390 may receive application monitoring data and network data from each of agents 1312, 1319, 1334, 1344 and 1354. Controller 1390 may associate portions of business transaction data, communicate with agents to configure collection of data, and provide performance data and reporting through an interface. The interface may be viewed as a web-based interface viewable by client device 1392, which may be a mobile device, client device, or any other platform for viewing an interface provided by controller 1390. In some embodiments, a client device 1392 may directly communicate with controller 1390 to view an interface for monitoring data.

Client device 1392 may include any computing device, including a mobile device or a client computer such as a desktop, work station or other computing device. Client computer 1392 may communicate with controller 1390 to create and view a custom interface. In some embodiments, controller 190 provides an interface for creating and viewing the custom interface as a content page, e.g., a web page, which may be provided to and rendered through a network browser application on client device 192.

Applications 132, 142, 152 and 162 may be any of several types of applications. Examples of applications that may implement applications 1332-1362 include a Java, PHP, .Net, Node.JS, and other applications.

Figure 14:
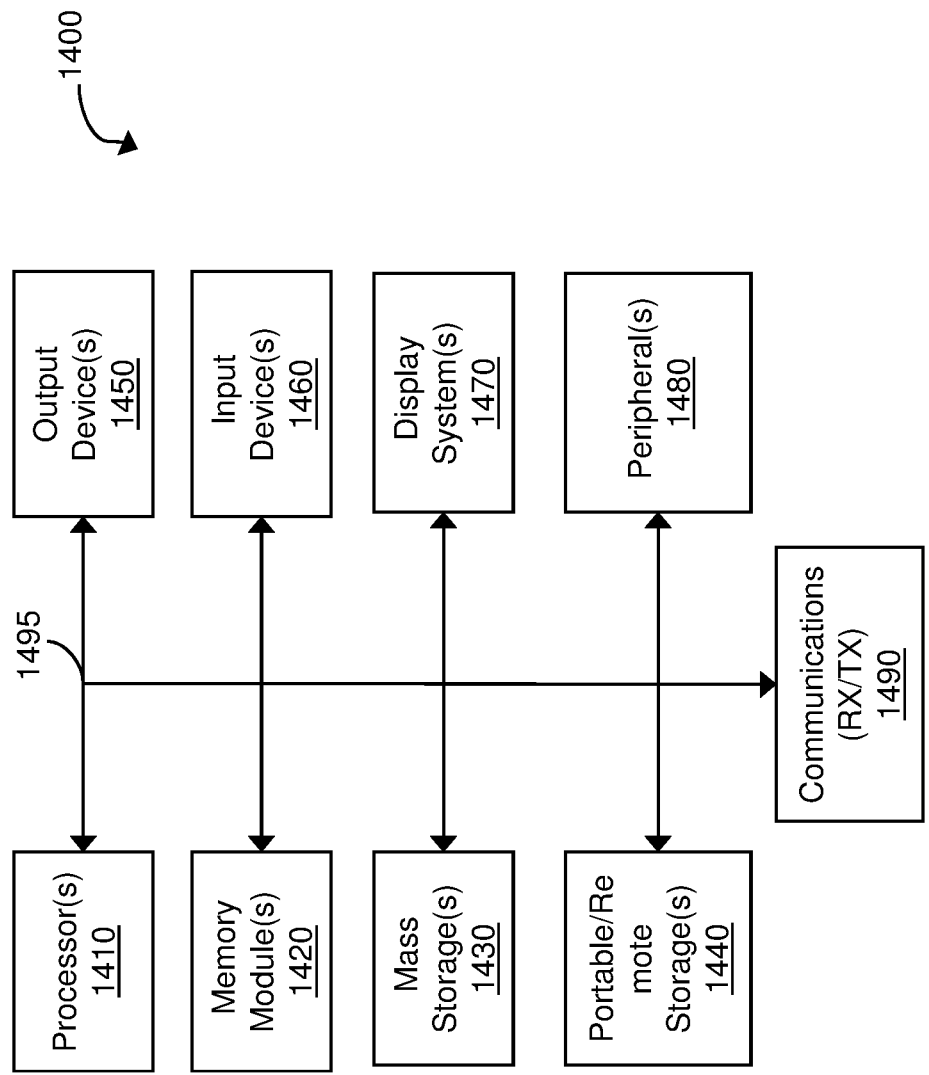
FIG. 14 is a block diagram of an exemplary computing system implementing the disclosed technology.

FIG. 14 is a block diagram of a computer system 1400 for implementing the present technology. System 1400 of FIG. 14 may be implemented in the contexts of the likes of clients 1305, 1392, network server 1325, servers 1330, 1340, 1350, 1360, a synchronous network machine 1370 and controller 1390.

The computing system 1400 of FIG. 14 includes one or more processors 1410 and memory 1420. Main memory 1420 stores, in part, instructions and data for execution by processor 1410. Main memory 1410 can store the executable code when in operation. The system 1400 of FIG. 14 further includes a mass storage device 1430, portable storage medium drive(s) 1440, output devices 1450, user input devices 1460, a graphics display 1470, and peripheral devices 1480.

The components shown in FIG. 14 are depicted as being connected via a single bus 1490. However, the components may be connected through one or more data transport means. For example, processor unit 1410 and main memory 1420 may be connected via a local microprocessor bus, and the mass storage device 1430, peripheral device(s) 1480, portable or remote storage device 1440, and display system 1470 may be connected via one or more input/output (I/O) buses.

Mass storage device 1430, which may be implemented with a magnetic disk drive or an optical disk drive, is a non-volatile storage device for storing data and instructions for use by processor unit 1410. Mass storage device 1430 can store the system software for implementing embodiments of the present invention for purposes of loading that software into main memory 620.

Portable storage device 1440 operates in conjunction with a portable non-volatile storage medium, such as a compact disk, digital video disk, magnetic disk, flash storage, etc. to input and output data and code to and from the computer system 1400 of FIG. 14. The system software for implementing embodiments of the present invention may be stored on such a portable medium and input to the computer system 1400 via the portable storage device 1440.

Input devices 1460 provide a portion of a user interface. Input devices 1460 may include an alpha-numeric keypad, such as a keyboard, for inputting alpha-numeric and other information, or a pointing device, such as a mouse, a trackball, stylus, or cursor direction keys. Additionally, the system 1400 as shown in FIG. 14 includes output devices 1450. Examples of suitable output devices include speakers, printers, network interfaces, and monitors.

Display system 1470 may include a liquid crystal display (LCD) or other suitable display device. Display system 1470 receives textual and graphical information, and processes the information for output to the display device.

Peripherals 1480 may include any type of computer support device to add additional functionality to the computer system. For example, peripheral device(s) 1480 may include a modem or a router.

The components contained in the computer system 1400 of FIG. 14 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 1400 of FIG. 14 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for monitoring a business transaction, comprising: a processor; a memory; and one or more modules stored in the memory and executable by a processor to perform operations comprising:
   receive, from a user interface client, a query for data indicative of performance of a monitored business transaction; estimate a wait time for the received query to return an overall result to be displayed; determine whether to chunk the received query to generate multiple chunked queries by comparing the estimated wait time against a predetermined threshold, the predetermined threshold indicative of an acceptable user experience;
   based on the determining, chunk the received query to generate the multiple chunked queries using a query chunking strategy selected from chunking strategy candidates, wherein the chunking strategy candidates are each associated with corresponding query equivalence classes that are identified based on dominant analytics functional parts of the received query, wherein a) the query equivalence classes are based on time-series, range, group by, or other analytics functions parsed out of the received query and b) each of the corresponding chunking strategy candidates is designed to work on a particular class of queries based on speed or time; after chunking the received query, determine an order of the multiple chunked queries based on the processing time of each of the multiple chunked queries, wherein the order includes processing part of the multiple chunked queries in parallel;
   process the generated multiple chunked queries in the order, wherein a result for each chunked query represents a portion of the overall result for the received query; and
   dynamically stream the result from each chunked query to the user interface client to be displayed as the processing of the chunked queries are completed so as to cause the overall result for the received query to be displayed portion by portion until converging on the overall result as the processing of all of the chunked queries are completed.

2. The system of claim 1, wherein the one or more modules are executable by a processor to select the chunking strategy by performing operations including: generate a score for each of the chunking strategy candidates; and select the chunking strategy from the candidates based on the score.

3. The system of claim 2, wherein the one or more modules are executable by a processor to identify the chunking strategy candidates appropriate for contexts of the received query.

4. The system of claim 1, wherein the one or more modules are executable by a processor to dynamically stream the result from each chunked query to the user interface client to be displayed in the order the processing of each chunked query is completed.

5. The system of claim 1, wherein the one or more modules are executable by a processor to assemble the results for a given chunked query with next subsequently completed chunked query to cause a combined result of the assembled chunked queries to be displayed.

6. The system of claim 5, wherein the one or more modules are executable by a processor to assemble the results to cause the combined result of the assembled chunked queries to be displayed in different ways depending on a type of graphics used to display the combined result.

7. The system of claim 6, wherein the type of graphics includes a bar chart, a pie chart, or a time line.

8. The system of claim 1, wherein the one or more modules are executable by a processor to monitor metrics representing a performance of the query chunking strategy.

9. The system of claim 8, wherein the one or more modules are executable by a processor to update the chunking strategy based on the monitored metrics.

10. The system of claim 1, wherein the monitored metrics representing the performance of the query chunking strategy include a wait time for processing each chunked query.

11. The system of claim 1, wherein the monitored metrics representing the performance of the query chunking strategy include a measure of how accurately the portion by portion display of the overall result of the received query compares to the converged overall result displayed.

12. A method for monitoring a business transaction, comprising: receiving, from a user interface client, a query for data indicative of performance of a monitored business transaction;
   estimating a wait time for the received query to return an overall result to be displayed;
   determining whether to chunk the received query to generate multiple queries by comparing the estimated wait time against a predetermined threshold, the predetermined threshold indicative of an acceptable user experience;

based on the determining, chunking the received query to generate multiple chunked queries using a query chunking strategy selected from chunking strategy candidates, wherein the chunking strategy candidates are each associated with corresponding query equivalence classes that are identified based on dominant analytics functional parts of the received query, wherein a) the query equivalence classes are based on time-series, range, group by, or other analytics functions parsed out of the received query and b) each of the corresponding chunking strategy candidates is designed to work on a particular class of queries based on speed or time;

after chunking the received query, determining an order of the multiple chunked queries based on the processing time of each of the multiple chunked queries, wherein the order includes processing part of the multiple chunked queries in parallel;

processing the generated multiple chunked queries in the order, wherein a result for each chunked query represents a partial result for the received query; dynamically streaming the result from each chunked query to the user interface client to cause the result from a corresponding chunked query to be displayed and aggregated until converging to an overall result for the received query; and monitoring performance metrics of the chunking strategy.

13. The method of claim 12, including selecting the query chunking strategy by performing operations including: generating a score for each of the chunking strategy candidates; and selecting the chunking strategy from the candidates based on the score.

14. The method of claim 12, wherein the order includes processing at least two of the chunked queries in parallel.

15. The method of claim 12, including updating the chunking strategy based on the monitored metrics.

16. A non-transitory computer readable medium embodying instructions when executed by a processor to cause operations to be performed comprising: receiving, from a user interface client, a query for data indicative of performance of a monitored business transaction;

estimating a wait time for the received query to return an overall result to be displayed;

determining whether to chunk the received query to generate multiple chunked queries by comparing the estimated wait time against a predetermined threshold, the predetermined threshold indicative of an acceptable user experience;

based on the determining, chunking the received query to generate multiple chunked queries using a query chunking strategy selected from chunking strategy candidates, wherein the chunking strategy candidates are associated with a query equivalence class that is identified based on the dominant analytics functional parts of the query, wherein the chunking strategy candidates are each associated with corresponding query equivalence classes that are identified based on dominant analytics functional parts of the received query, wherein a) the query equivalence classes are based on time-series, range, group by, or other analytics functions parsed out of the received query and b) each of the corresponding chunking strategy candidates is designed to work on a particular class of queries based on speed or time;

after chunking the received query, determining an order of the multiple chunked queries based on the processing time of each of the multiple chunked queries, wherein the order includes processing part of the multiple chunked queries in parallel;

processing the generated multiple chunked queries, wherein a result for each chunked query represents a partial result for the received query; and dynamically streaming the result from each chunked query to the user interface client to cause the result from a corresponding chunked query to be displayed and aggregated until converging to an overall result for the received query.

17. The non-transitory computer readable medium of claim 16, wherein the instructions when executed by a processor can cause operations to be performed including monitoring performance metrics of the chunking strategy.

18. The non-transitory computer readable medium of claim 16, wherein the instructions when executed by a processor can cause operations to be performed including updating the query chunking strategy based on the monitored performance metrics.

19. The non-transitory computer readable medium of claim 16, wherein selecting the chunking strategy comprises; generating a score for each of the chunking strategy candidates; and selecting the chunking strategy from the candidates based on the score.

20. The non-transitory computer readable medium of claim 19, wherein selecting the chunking strategy further comprises: identifying the chunking strategy candidates appropriate for contexts of the received query.

\* \* \* \* \*